(12) United States Patent
Matsuoka et al.

(10) Patent No.: US 11,300,794 B2
(45) Date of Patent: Apr. 12, 2022

(54) RECORDING MEDIUM, INFORMATION PROCESSING SYSTEM, AND INFORMATION PROCESSING METHOD

(71) Applicant: KONAMI DIGITAL ENTERTAINMENT CO., LTD., Tokyo (JP)

(72) Inventors: Isao Matsuoka, Tokyo (JP); Junichi Taniguchi, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 0 days.

(21) Appl. No.: 17/003,429

(22) Filed: Aug. 26, 2020

(65) Prior Publication Data

US 2020/0393683 A1    Dec. 17, 2020

Related U.S. Application Data

(63) Continuation of application No. PCT/JP2019/007660, filed on Feb. 27, 2019.

(30) Foreign Application Priority Data

Feb. 28, 2018    (JP) .............................. JP2018-035240

(51) Int. Cl.
| | | |
|---|---|---|
| *G02B 27/01* | (2006.01) | |
| *G02B 27/00* | (2006.01) | |
| *G06T 19/00* | (2011.01) | |

(52) U.S. Cl.
CPC ..... *G02B 27/0172* (2013.01); *G02B 27/0093* (2013.01); *G02B 27/0101* (2013.01);
(Continued)

(58) Field of Classification Search
CPC ............ G02B 27/0172; G02B 27/0093; G02B 27/0101; G02B 2027/0134; G02B 2027/0138; G06T 19/006
See application file for complete search history.

(56) References Cited

U.S. PATENT DOCUMENTS

| | | | | |
|---|---|---|---|---|
| 2013/0106674 A1* | 5/2013 | Wheeler | ............ | G02B 27/0176 345/8 |
| 2013/0128364 A1* | 5/2013 | Wheeler | ................ | A61B 3/113 359/630 |

(Continued)

FOREIGN PATENT DOCUMENTS

| | | | | |
|---|---|---|---|---|
| JP | 2003325973 A | * | 11/2003 | ........... A63F 13/323 |
| JP | 201659556 A | | 4/2016 | |

(Continued)

OTHER PUBLICATIONS

International Search Report dated Apr. 2, 2019, in International application No. PCT/JP2019/007660.
(Continued)

*Primary Examiner* — Kevin M Nguyen
(74) *Attorney, Agent, or Firm* — Sughrue Mion, PLLC

(57) ABSTRACT

A processor causes a display provided on a Head Mounted Display to display a stereoscopic image to which binocular parallax is applied, the stereoscopic image being an image of a virtual space captured by a virtual camera, and acquire orientation information on an orientation of the Head Mounted Display. When, in the virtual space, a predetermined positional relationship is established between a virtual object that exists in the virtual space and a virtual line that passes through the virtual camera, the virtual line having a direction according to the orientation information, the processor causes to move, based on a change in relative position between the virtual line and the virtual object, a display range of display information to be displayed in the
(Continued)

virtual space, the display range being a part of the display information and displayed in the display region provided in the virtual space.

13 Claims, 17 Drawing Sheets

(52) U.S. Cl.
CPC .... *G06T 19/006* (2013.01); *G02B 2027/0134* (2013.01); *G02B 2027/0138* (2013.01)

(56) References Cited

U.S. PATENT DOCUMENTS

| | | | | |
|---|---|---|---|---|
| 2015/0206321 | A1* | 7/2015 | Scavezze | G06T 7/20 345/633 |
| 2015/0331240 | A1* | 11/2015 | Poulos | G06T 19/006 345/8 |
| 2016/0033770 | A1* | 2/2016 | Fujimaki | H04N 13/344 345/8 |
| 2017/0038837 | A1* | 2/2017 | Faaborg | G06F 3/011 |
| 2017/0140224 | A1* | 5/2017 | Wilson | G06K 9/00604 |
| 2017/0182414 | A1* | 6/2017 | Oishi | A63F 13/537 |
| 2018/0031845 | A1* | 2/2018 | Yoshioka | G03B 25/02 |
| 2018/0260024 | A1* | 9/2018 | Maltz | G06F 3/013 |
| 2018/0341386 | A1* | 11/2018 | Inomata | G06T 13/40 |
| 2019/0065026 | A1* | 2/2019 | Kiemele | G02B 27/0172 |
| 2019/0220089 | A1* | 7/2019 | Kakizawa | G06T 7/73 |
| 2019/0244416 | A1* | 8/2019 | Tamaoki | A63F 13/211 |

FOREIGN PATENT DOCUMENTS

| | | | | |
|---|---|---|---|---|
| JP | 2016115122 | A | | 6/2016 |
| JP | 2017097712 | A * | 6/2017 | ............ G05B 23/02 |
| JP | 201815547 | A | | 2/2018 |
| JP | 2018147375 | A * | 9/2018 | |

OTHER PUBLICATIONS

Written Opinion of the International Searching Authority dated Apr. 2, 2019, in International Application No. PCT/JP2019/007660.
Communication dated Jul. 10, 2018, from the Japanese Patent Office in application No. 2018-035240.
Communication dated Oct. 9, 2018, from the Japanese Patent Office in application No. 2018-035240.
Communication dated Jan. 29, 2019, from the Japanese Patent Office in application No. 2018-035240.
"Art exhibition of virtual space", 2016, Retrieved from: URL: <https://www.youtube.com/watch?v=mv-GWYVH3jk> (1 page total).
Communication dated Feb. 10, 2022 from the Korean Patent Office in Korean Application No. 10-2020-7025054.

* cited by examiner

RECORDING MEDIUM, INFORMATION PROCESSING SYSTEM, AND INFORMATION PROCESSING METHOD

CROSS REFERENCE TO RELATED APPLICATIONS

This Application is a Continuation Application of PCT Application No. PCT/JP2019/007660, filed Feb. 27, 2019, which is based on and claims priority from Japanese Patent Application No. 2018-035240, filed Feb. 28, 2018, the entire contents of which are incorporated herein by reference.

BACKGROUND

Field of Invention

The present invention relates to recording mediums, information processing systems, and information processing methods.

Description of Related Art

Head Mounted Displays (HMDs) are being widely used recently. A HMD is set on a user's head, and displays, on a display thereof provided in the front of the user's eyes, for example, an image that is captured by a virtual camera and is a stereoscopic image to which binocular parallax is applied (see Japanese Patent Application Laid-Open Publication No. 2016-115122). In general, such a HMD changes an orientation of the virtual camera in a virtual space, based on a change in orientation of the HMD, thereby enabling the user to view various directions in the virtual space.

However, the user wearing the HMD looks at the display provided in front of the user's eyes. This makes difficult for the user to see anything other than the display. Accordingly, an input operation with a controller, or with other similar device, that is held in the user's hand may be a burden on the user wearing the HMD, for example. For this reason, in a game or the like using the HMD, in order to avoid an excessive burden on the user wearing the HMD, it is preferred that various instructions be accepted from the user according to a change in orientation of the HMD, for example.

However, in a case in which instructions from the user are accepted according to a change in orientation of the HMD, it is difficult for the user wearing the HMD to carry out an input operation other than an input operation to change orientation of the virtual camera in the virtual space. For example, it may be difficult for the user to carry out an input operation to change a display range of display information to be displayed in a display region provided in the virtual space.

SUMMARY

The present invention has been made in view of the problem described above, and it has as its object provision of a technique that enables a user wearing a HMD to carry out input operation to change a display range of display information to be displayed in a display region, which is provided in a virtual space that is displayed on a display of the HMD.

To achieve the stated object, a recording medium according to an aspect of the present invention is a non-transitory computer readable recording medium having recorded therein a program that is executed by a processor of an information processing apparatus, the program causes the processor to: cause a display provided on a Head Mounted Display to display a stereoscopic image to which binocular parallax is applied, the stereoscopic image being an image of a virtual space captured by a virtual camera; and acquire orientation information on an orientation of the Head Mounted Display, in which: when, in the virtual space, a predetermined positional relationship is established between a virtual object that exists in the virtual space and a virtual line that passes through the virtual camera, the virtual line having a direction according to the orientation information, the program causes the processor to move, based on a change in relative position between the virtual line and the virtual object, a display range of display information to be displayed in the virtual space, the display range being a part of the display information and displayed in the display region provided in the virtual space.

An information processing system according to an aspect of the present invention includes: a Head Mounted Display including a display; and an information processing apparatus, in which: the information apparatus includes: a processor; and a memory that is operatively coupled to the processor and is configured to store instructions executed by the processor, upon execution of the instructions the processor is configured to: cause the display to display a stereoscopic image to which binocular parallax is applied, the stereoscopic image being an image of a virtual space captured by a virtual camera; and acquire orientation information on an orientation of the Head Mounted Display, when, in the virtual space, a predetermined positional relationship is established between a virtual object that exists in the virtual space and a virtual line that passes through the virtual camera, the virtual line having a direction according to the orientation information, the processor is configured to move, based on a change in relative position between the virtual line and the virtual object, a display range of display information to be displayed in the virtual space, the display range being a part of the display information and displayed in the display region provided in the virtual space.

An information processing method according to an aspect of the present invention includes: causing a display provided on a Head Mounted Display to display a stereoscopic image to which binocular parallax is applied, the stereoscopic image being an image of a virtual space captured by a virtual camera; and acquiring orientation information on an orientation of the Head Mounted Display, in which: in causing the display to display the stereoscopic image, when, in the virtual space, a predetermined positional relationship is established between a virtual object that exists in the virtual space and a virtual line that passes through the virtual camera, the virtual line having a direction according to the orientation information, moving, based on a change in relative position between the virtual line and the virtual object, a display range of display information to be displayed in the virtual space, the display range being a part of the display information and displayed in the display region provided in the virtual space.

DESCRIPTION OF THE EMBODIMENTS

Hereafter, modes for carrying out the present invention will be described with reference to the drawings. In each of the drawings, the dimensions and scale of each portion may appropriately differ from actual dimensions and scale. Furthermore, since the embodiments to be described below are preferred specific examples of the present invention, various types of technically preferable limits are given. However, the scope of the present invention is not limited to these modes unless otherwise specified in the following description.

A. Embodiment

An embodiment of the present invention will be described below.

1. Overview of Head Mounted Display

An overview of a Head Mounted Display 1 (hereafter a "HMD 1") according to the embodiment will be described below with reference to FIGS. 1 to 10.

1.1. Configuration of Head Mounted Display and Usage Thereof

First, the configuration of the HMD 1 and usage thereof will be described with reference to FIGS. 1 and 2.

Figure 1:
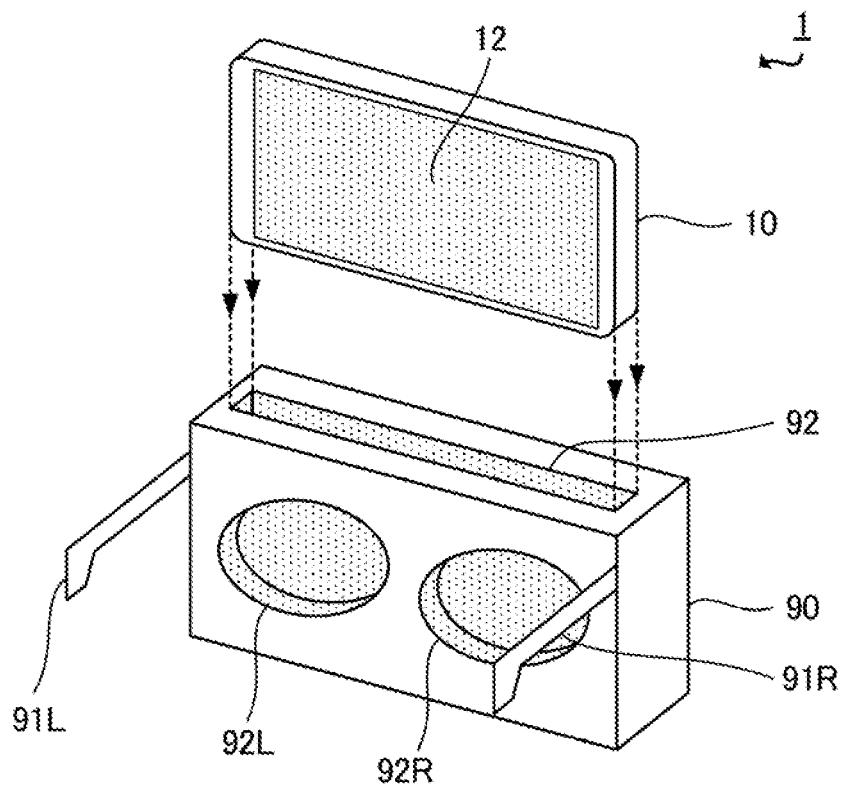
FIG. 1 is an explanatory diagram of an example configuration of a Head Mounted Display 1 according to an embodiment of the present invention.

FIG. 1 is an exploded perspective view for an example of the configuration of the HMD 1 according to the embodiment. FIG. 2 is an explanatory diagram of an example of a usage concept of the HMD 1 according to the embodiment.

As shown in FIG. 1, the HMD 1 includes a terminal apparatus 10 and wearable equipment 90. The terminal apparatus 10 (an example of "an information processing apparatus") includes a display 12. In the embodiment, an exemplary case is assumed in which a smartphone is employed for the terminal apparatus 10. However, the terminal apparatus 10 may be dedicated to a display apparatus for the HMD 1.

Figure 2:
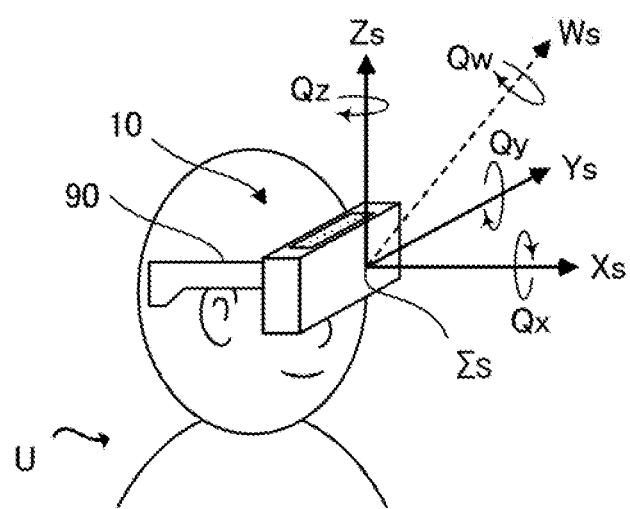
FIG. 2 is an explanatory diagram of an example usage of the Head Mounted Display 1.

As shown in FIG. 2, the wearable equipment 90 is a component for wearing the HMD 1 on a user U's head. As shown in FIG. 1, the wearable equipment 90 includes: a pair of temples 91L and 91R for wearing the HMD1 on the user U's head; a mounting space 92 for mounting the terminal apparatus 10 on the HMD1; and a pair of openings 92L and 92R. The openings 92L and 92R are provided at positions that correspond to those of the user U's eyes when the user U wears the HMD 1 on the head. There may be provided lenses at portions of the openings 92L and 92R. When the user U wears the HMD 1 on the head, the user U is able to view with the left eye the display 12 through the opening 92L or a lens provided in the opening 92L, the display 12 being included in the terminal apparatus 10 and the terminal apparatus 10 being inserted in the mounting space 92. The user U is able to view with the right eye the display 12 through the opening 92R or a lens provided in the opening 92R, the display 12 being included in the terminal apparatus 10 and the terminal apparatus 10 being inserted in the mounting space 92.

As shown in FIG. 2, the user U wearing the HMD 1 on the head is able to change orientation of the HMD 1 by changing orientation of the user U's head. For the sake of clarity, a coordinate system fixed to the HMD 1, which is referred to as an "apparatus coordinate system $\Sigma_S$," will be used. The term "apparatus coordinate system $\Sigma_S$" refers to a three-axis orthogonal coordinate system that has an $X_S$-axis, a $Y_S$-axis and a $Z_S$-axis orthogonal to one another and has the origin at a predetermined position of the HMD 1, for example. In the embodiment, as shown in FIG. 2, an exemplary case is assumed in which when the user U wears the HMD 1, the apparatus coordinate system $\Sigma_S$ is set as follows. When viewed by the user U, a $+X_S$ direction represents a direction that is in front of the user U. When viewed by the user U, a $+Y_S$ direction represents a direction that is on the left. When viewed by the user U, a $+Z_S$ direction represents an upward direction.

As shown in FIG. 2, the user U wearing the HMD 1 on the head is able to change the orientation of the HMD1 by changing the orientation of the head such that the HMD 1 rotates in the rotational direction around the $X_S$-axis, that is, a roll direction $Q_X$. Likewise, the user U is able to change the orientation of the HMD1 by changing the orientation of the head such that the HMD 1 rotates in the rotational direction around the $Y_S$-axis, that is, a pitch direction $Q_Y$. The user U is able to change the orientation of the HMD1 by changing the orientation of the head such that the HMD 1 rotates in the rotational direction around the $Z_S$-axis, that is, a yaw direction $Q_Z$. In other words, the user U wearing the HMD 1 on the head is able to change the orientation of the HMD 1 by changing the orientation of the head such that the HMD 1 rotates in a desired rotational direction that is obtained by combining some or all of the roll direction $Q_X$, the pitch direction $Q_Y$ and the yaw direction $Q_Z$, that is, the rotational direction $Q_W$ around a desired rotational axis $W_S$. In the following description, an apparatus coordinate system $\Sigma_S$ fixed to the HMD 1 at a reference time t0 will be referred to as a "reference apparatus coordinate system $\Sigma_{S0}$." In the embodiment, the orientation of the HMD 1 at time t after the reference time t0 will be described as an orientation that is obtained by rotating the HMD 1 at the reference time t0 by an angle $\theta_W$ in the rotational direction $Q_W$ around the rotational axis $W_S$. In other words, in the embodiment, the apparatus coordinate system $\Sigma_S$ at time t after the reference time t0 will be described as a coordinate system having an axis that is obtained by rotating each of the axis of the reference apparatus coordinate system $\Sigma_{S0}$ by the angle $\theta_W$ around the rotational axis $W_S$.

The terminal apparatus 10 captures an image of a virtual space SP-V with a virtual camera CM that is present in the virtual space SP-V. The terminal apparatus 10 causes the display 12 to display a display image GH representative of a result of an image captured by the virtual camera CM.

1.2 Virtual Space and Virtual Camera

The virtual space SP-V and the virtual camera CM will be described with reference to FIGS. 3 to 6.

Figure 3:
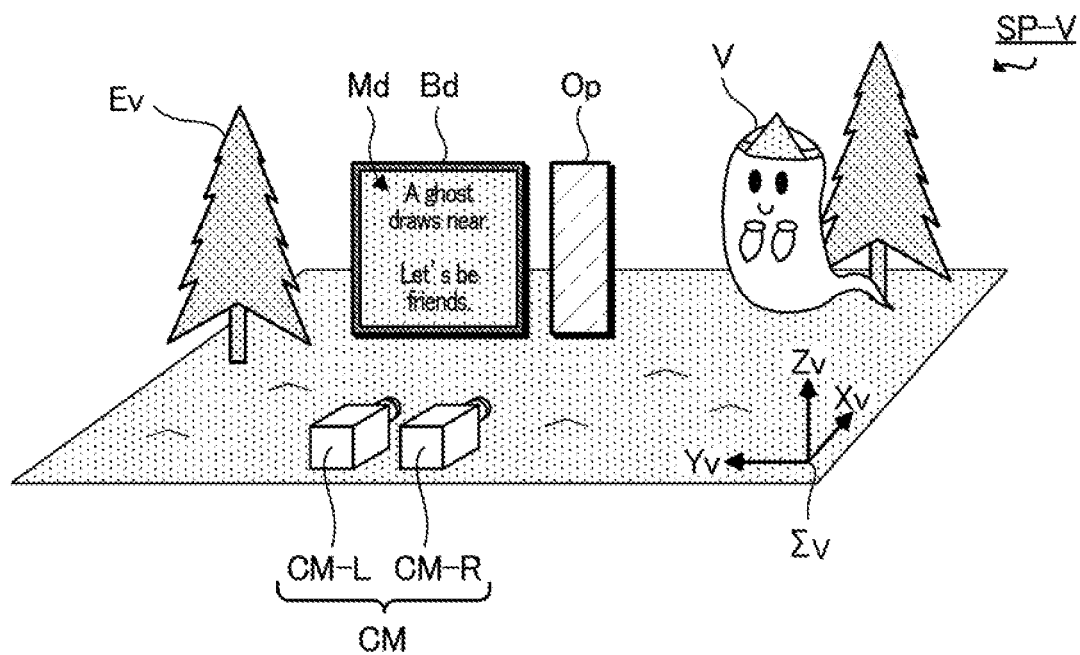
FIG. 3 is an explanatory diagram for an example of a virtual space SP-V.

FIG. 3 is an explanatory diagram for the virtual space SP-V.

In the embodiment, as shown in FIG. 3, an exemplary case is assumed in which the following are provided in the virtual space SP-V: environment components Ev composing the virtual space SP-V, such as a virtual ground, mountains, trees or the like; a virtual character V; a virtual message board Bd that has an area for displaying information (hereafter, occasionally referred to as "display region"); a controlled object Op (an example of a "virtual object") for an input operation to change information displayed on the message board Bd; and the virtual camera CM for capturing an image of the virtual space SP-V. In the embodiment, an exemplary case is assumed in which some of a message Ms that is composed of a plurality of characters can be displayed on the message board Bd. The message Ms is an example of "display information." That is, in the embodiment, an exemplary case is assumed in which the number of characters included in the message Ms is greater than that of characters the message board Bd can display (i.e., the maximum number of characters on the message board Bd). In the following description, a "display message Md" will be defined as follows: the display message Md represents one or more characters displayed in the display region of the message board Bd from among the plurality of characters included in the message Ms (see FIG. 10 described later). Although details will be described later, in the embodiment, the user U wearing the HMD 1 is able to change the range displayed in the display region from among the message Ms and to change the contents of the display message Md by changing the orientation of the HMD 1. In the embodiment, each character included in the message Ms is an example of "a unit display information." However, the "unit display information" may be some characters from among a plurality of characters included in the message Ms. For example, in a case in which the message Ms is displayed in a plurality of lines, each line may correspond to the "unit display information."

In the embodiment, as shown in FIG. 3, an exemplary case is assumed in which the virtual camera VM is composed of a left-eye virtual camera CM-L and a right-eye virtual camera CM-R. For the sake of clarity, as shown in FIG. 3, a coordinate system fixed to the virtual space SP-V, which is referred to as "a virtual space coordinate system $\Sigma_V$" will be used. Here, the "virtual space coordinate system $\Sigma_V$" refers to a three-axis orthogonal coordinate system that has an $X_V$-axis, a $Y_V$-axis and a $Z_V$-axis orthogonal to one another and has the origin at a predetermined position in the virtual space SP-V, for example.

Figure 4:
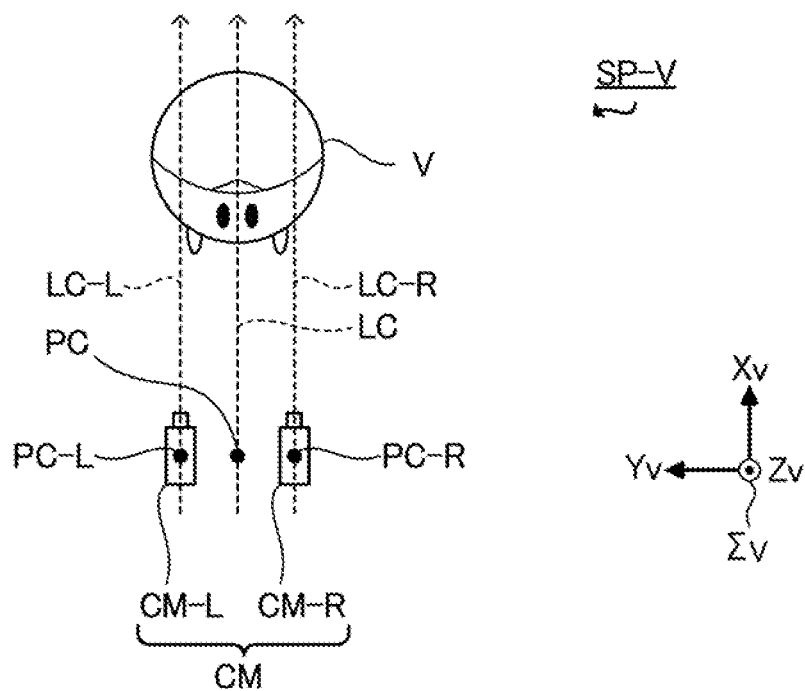
FIG. 4 is an explanatory diagram for an example of a virtual camera CM in the virtual space SP-V.

FIG. 4 is an explanatory diagram for the virtual camera CM in the virtual space SP-V. FIG. 4 shows an exemplary case in which the virtual space SP-V is viewed in planar view from the $+Z_V$ direction. FIG. 4 also shows an exemplary case in which the virtual camera CM captures an image of the character V in a direction that is in front of the character V.

In the following description, as shown in FIG. 4, the "position PC" will be defined as follows: the position PC indicates the midpoint between a position PC-L of the virtual camera CM-L in the virtual space SP-V and a position PC-R of the virtual camera CM-R in the virtual space SP-V. Furthermore, in the following description, as shown in FIG. 4, the "virtual straight line LC-L" will be defined as follows: the virtual straight line LC-L represents a virtual straight line that intersects with a position PC-L and extends in an optical axis direction of the virtual camera CM-L. Likewise, the "virtual straight line LC-R" will be defined as follows: the virtual straight line LC-R represents a virtual straight line that intersects with position PC-R and extends in an optical axis direction of the virtual camera CM-R. Furthermore, in the following description, a "virtual straight line LC (an example of a "virtual line")" will be defined by the virtual straight line LC representative of a virtual straight line that intersects with the position PC. Specifically, the virtual straight line LC extends in a direction indicated by the sum of a unit vector representative of the optical axis direction of the virtual camera CM-L and a unit vector representative of the optical axis direction of the virtual camera CM-R. In the embodiment, an exemplary case is presumed in which the virtual camera CM is present at the position PC, and the optical axis of the virtual camera CM is a virtual straight line LC. Furthermore, in the embodiment, an exemplary case is assumed in which the direction in which the virtual straight line LC-L extends is the same as that of the virtual straight line LC-R. For this reason, in the embodiment, the direction in which the virtual straight line LC extends is the same as each of the directions in which the virtual straight line LC-L extends and the virtual straight line LC-R extends.

Figure 5:
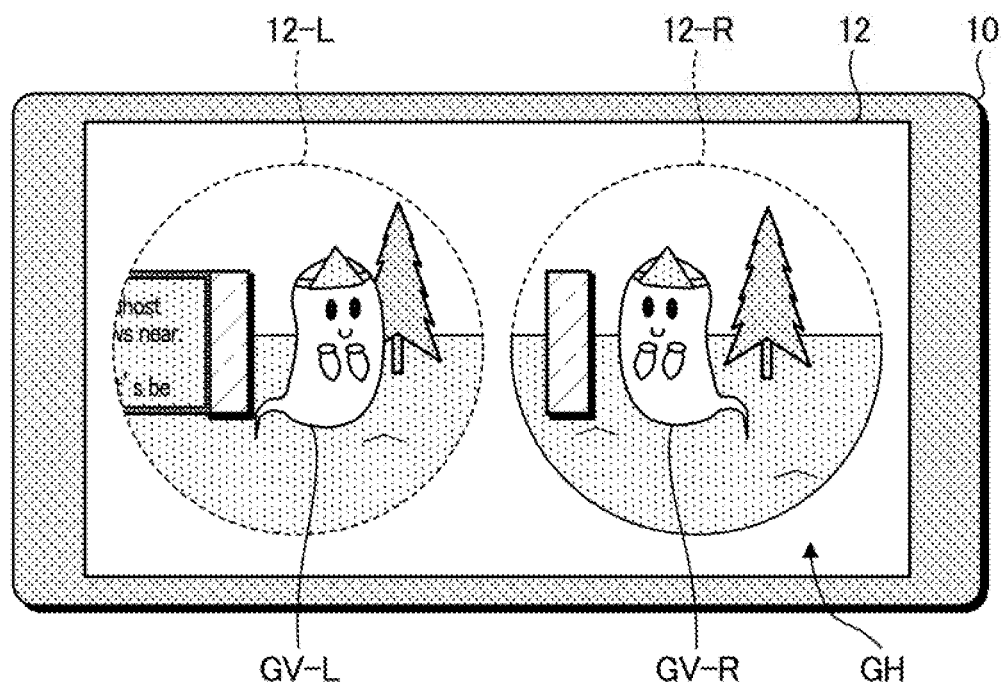
FIG. 5 is an explanatory diagram for an example of a display image GH.

FIG. 5 is an exemplary drawing a display image GH representative of a result of an image of the virtual space SP-V captured by the virtual camera CM. In FIG. 5, a case is assumed in which the virtual camera CM captures an image of the character V in a direction that is in front of the character V, as shown in FIG. 4.

As shown in FIG. 5, the display 12 displays, on a left-eye viewing area 12-L that is viewed through the opening 92L, a result of an image captured by the virtual camera CM-L, e.g., a character image GV-L representative of a result of an image of the character V captured by the virtual camera CM-L. Likewise, the display 12 displays, on a right-eye viewing area 12-R that is viewed through the opening 92R, an image captured by the virtual camera CM-R. e.g., a character image GV-R representative of a result of an image of the character V captured by the virtual camera CM-R. In other word, the user U is able to view the character image GV-L with the left eye and view the character image GV-R with the right eye. For this reason, as will be described later with reference to FIG. 7 and other drawings, the user U is able to view virtual objects, such as the character V and the like in the virtual space SP-V, on the display 12, as three-dimensional objects, for example. The above-mentioned virtual three-dimensional image that is viewed by the user U wearing the HMD 1 will be referenced to as a "visible image GS." The "three-dimensional objects" are simply required to be objects that disposed in the virtual three-dimensional space. For example, the "three-dimensional objects" may be three-dimensional objects that disposed in the virtual three-dimensional space, or may be two-dimensional objects that disposed in the virtual three-dimensional space.

Figure 6:
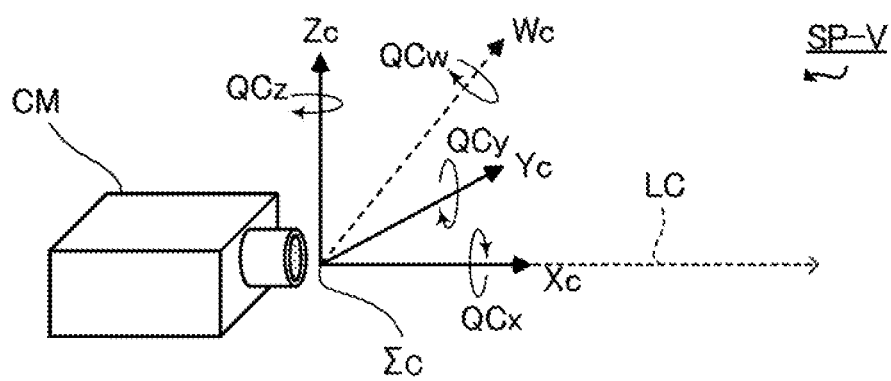
FIG. 6 is an explanatory diagram for an example of a change in orientation of the virtual camera CM in the virtual space SP-V.

For the sake of clarity, as shown in FIG. 6, a coordinate system fixed to the virtual camera CM in the virtual space SP-V, which is referred to as "a camera coordinate system $\Sigma_C$," will be used. Here, the camera coordinate system $\Sigma_C$ refers to three orthogonal coordinates that has an $X_C$-axis, a $Y_C$-axis and a $Z_C$-axis orthogonal to one another and has the origin at the position PC where the virtual camera CM exists in the virtual space SP-V, for example. In the embodiment, an exemplary case is assumed in which when the user U wears the HMD 1, the camera coordinate system $\Sigma_C$ is set as follows. When viewed by the user U, a $+X_C$ direction represents a direction that is in front of the user U. When viewed by the user U, a $+Y_C$ direction represents a direction that is on the left. When viewed by the user U, a $+Z_C$ direction represents an upward direction. In other words, in the embodiment, an exemplary case is assumed in which when viewed by the user U wearing the HMD 1, the $X_C$-axis is the same direction as the $X_S$-axis, the $Y_C$-axis is the same direction as the $Y_S$-axis, and the $Z_C$-axis is the same direction as the $Z_S$-axis. Furthermore, in the embodiment, an exemplary case is assumed in which the $X_C$-axis corresponds to the virtual straight line LC. In other words, in the embodiment, an exemplary case is assumed in which the virtual straight line LC extends in the direction that is in front of the user U wearing the HMD 1.

As shown in FIG. 6, the virtual camera CM is rotatable in a desired rotational direction that is obtained by combining some or all of a roll direction $QC_X$ representative of the rotational direction around the $X_C$-axis, a pitch direction $QC_Y$ representative of the rotational direction around the $Y_C$ axis, and a yaw direction $QC_Z$ representative of the rotational direction around the $Z_C$-axis. In the embodiment, an exemplary case is given in which when the HMD 1 rotates in the rotational direction $Q_W$ around the rotational axis $W_S$ by an angle $\theta_W$, the virtual camera CM rotates by an angle $\theta_C$ in the rotational direction $Q_{CW}$ around the rotational axis $W_C$. Here, the rotational axis $W_C$ corresponds to, for example, a straight line that intersects with the position PC. Specifically, the rotational axis $W_C$ represents a straight line in which the component of a unit vector representative of the direction of the rotational axis $W_S$ in the apparatus coordinate system $\Sigma_S$ is the same as that of a unit vector representative of the direction of the rotational axis $W_C$ in the camera coordinate system $\Sigma_C$. Furthermore, an exemplary case is given in which the angle $\theta_C$ equals the angle $\theta_W$. In the following description, the camera coordinate system $\Sigma_C$ at the reference time t0 will be referred to as a reference camera coordinate system $\Sigma_{C0}$. In other words, the camera coordinate system $\Sigma_C$ at time t will be described as a coordinate system that has coordinate axes obtained by rotating each coordinate axis of the reference camera coordinate system $\Sigma_{C0}$ by the angle $\theta_C$ around the rotational axis $W_C$.

1.3. Images Displayed on the Display

The visible image GS displayed on the display 12 will be described below with reference to FIGS. 7 to 10.

Figure 7:
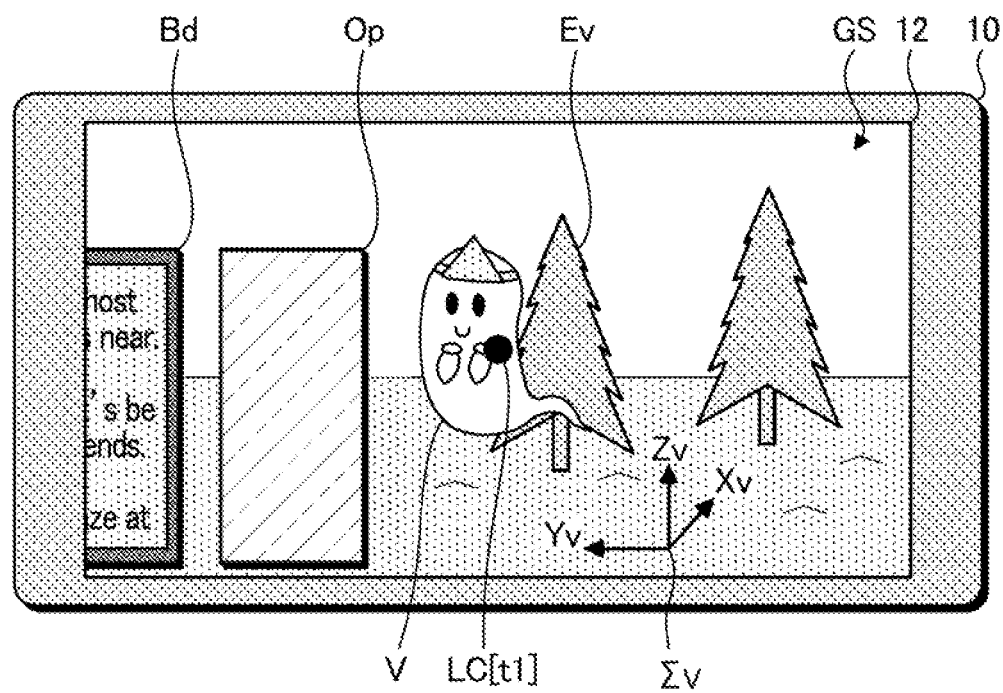
FIG. 7 is an explanatory diagram for an example of a visible image GS.
Figure 8:
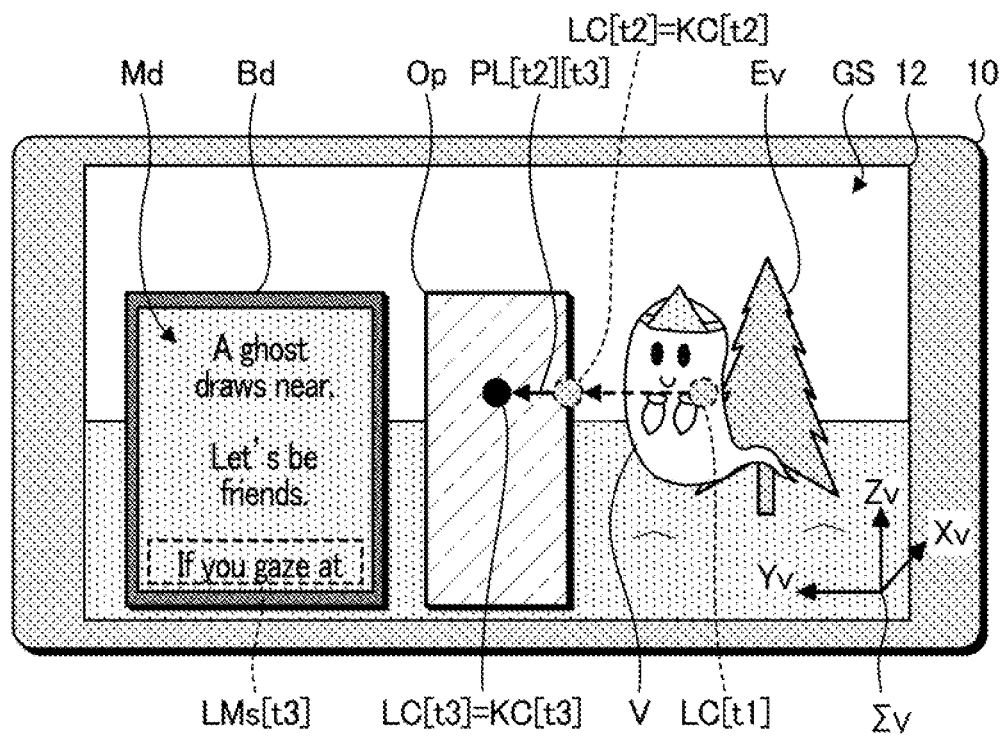
FIG. 8 is an explanatory diagram for an example of a visible image GS.
Figure 9:
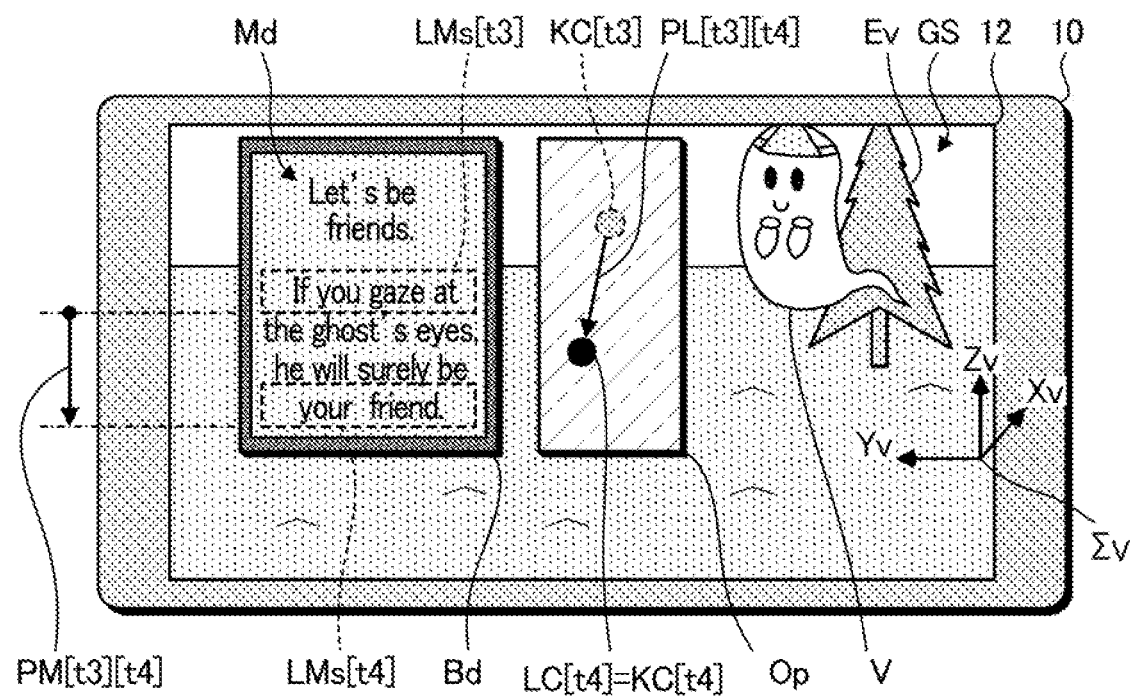
FIG. 9 is an explanatory diagram for an example of a visible image GS.
Figure 10:
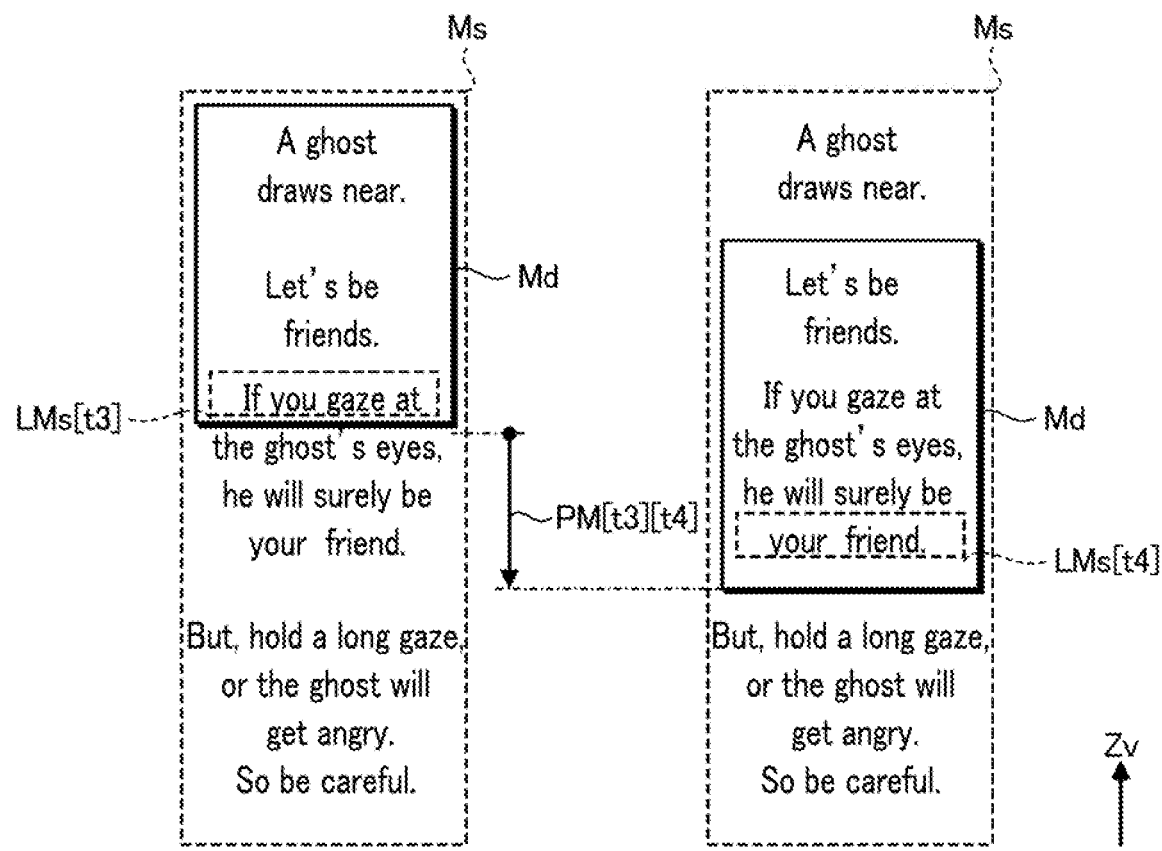
FIG. 10 is an explanatory diagram for an example of a relationship between a message Ms and a display message Md.

FIGS. 7 to 9 show examples of changes in the visible image GS (hereafter, "screen-change examples") displayed on the display 12 from time t1 after the reference time t0 to time t4. Among these drawings, FIG. 7 shows an example of the visible image GS displayed on the display 12 at time t1. FIG. 8 shows an example of the visible image GS displayed on the display 12 at time t3 after time t1. FIG. 9 shows an example of the visible image GS displayed on the display 12 at time t4 after time t3. FIG. 10 is an explanatory diagram of a relationship between a message Ms and a display message Md. In the following description, the virtual straight line LC at time t may on occasion be described as virtual straight line LC[t].

As shown in FIGS. 7 to 9, in the embodiment, the visible image GS includes some or all of the following: the character V that is viewed, as a three-dimensional object disposed in the virtual space SP-V, by the user U wearing the HMD 1; the message board Bd viewed, as a three-dimensional object disposed in the virtual space SP-V, by the user U; the controlled object Op viewed, as a three-dimensional object disposed in the virtual space SP-V, by the user U; and the environment components $E_V$ disposed in the virtual space SP-V, by the user U. In the embodiment, for the sake of clarity, a case is assumed in which, in the virtual space SP-V, positions of the message board Bd, the controlled object Op, the character V and the environment components $E_V$ remain unchanged. In other words, in the embodiment, a case is assumed in which, in the virtual space coordinate system $\Delta_V$ positions of the message board Bd, the controlled object Op, the character V and the environment components $E_V$ remain unchanged. Furthermore, in the embodiment, an exemplary case is assumed in which a distance from the virtual camera CM to the message board Bd is substantially the same as a distance from the virtual camera CM to the controlled object Op. Here, the "distance from the virtual camera CM to the message board Bd is substantially the same as a distance from the virtual camera CM to the controlled object Op" may refer to a case simultaneously satisfying the following requirements (1-i) and (1-ii):

(1-i) a difference by taking (a) the shortest distance from the virtual camera CM to the message board Bd, and (b) the shortest distance from the virtual camera CM to the controlled object Op is less than a difference by taking (c) the shortest distance from the virtual camera CM to the message board Bd, and (d) the shortest distance from the virtual camera CM to the character V; and (1-ii) a difference by taking (e) the shortest distance from the virtual camera CM to the message board Bd, and (f) the shortest distance from the virtual camera CM to the controlled object Op is less than a difference by taking (g) the shortest distance from the virtual camera CM to the controlled object Op, and (h) the shortest distance from the virtual camera CM to the character V.

Alternatively, the "distance from the virtual camera CM to the message board Bd is substantially the same as a distance between the virtual camera CM and the controlled object Op" may refer to a case simultaneously satisfying the following requirements (2-i) and (2-ii):

(2-i) the distance from the virtual camera CM to the message board Bd is equal to or greater than F times the distance from the virtual camera CM to the controlled object Op; and (2-ii) the distance from the virtual camera CM to the message board Bd is equal to or less than δ times the distance from the virtual camera CM to the controlled object Op.

where, ε is a real number satisfying $0.5 \leq \varepsilon \approx 1$, and δ is a real number satisfying $1 \leq \delta \leq 2$.

Furthermore, the "distance from the virtual camera CM to the message board Bd is substantially the same as a distance between the virtual camera CM and the controlled object Op" may refer to the following case (3-i) or (3-ii):

(3-i) the distance from the virtual camera CM to the controlled object Op is determined based on the distance from the virtual camera CM to the message board Bd; and (3-ii) the distance from the virtual camera CM to the message board Bd is determined based on the distance from the virtual camera CM to the controlled object Op.

However, the present invention is not limited to such an aspect. In the virtual space SP-V, the positions of the message board Bd, the controlled object Op, the character V, and the environment components $E_V$ may change. For example, the message board Bd may be disposed at a constant position all the time when viewed by the camera coordinate system $\Sigma_C$. In other words, the position of the message board Bd that is viewed by the virtual camera CM may remain unchanged. That is, the position of the message board Bd in the virtual space coordinate system $\Sigma_V$ may change according to a change in orientation of the virtual camera CM. For example, the controlled object Op may be disposed at a constant position all the time when viewed by the camera coordinate system ΣC. In other words, the position of the controlled object Op that is viewed by the virtual camera CM may remain unchanged. That is, the position of the controlled object Op in the virtual space coordinate system $\Sigma_V$ may change according to a change in orientation of the virtual camera CM.

In a screen-change example shown in FIG. 7, a case is assumed in which the virtual straight line LC[t1] intersects with the character V at time t1. Furthermore, in a screen-change example shown in FIG. 8, a case is assumed in which the virtual straight line LC and the controlled object Op begin to intersect each other at time t2, which is between time t1 and time t3. Specifically, in the screen-change example, a case is assumed as follows. At time t2, the virtual straight line LC[t2] and the controlled object Op intersect each other at an intersection KC[t2]. At time t3, the virtual straight line LC[t3] and the controlled object Op intersect each other at an intersection KC[t3]. In the following description, a "vector PL[t−1][t]" will be defined by a vector having the start point, which is at an intersection KC[t−1] at the time (t−1) before time t, and the end point, which is at an intersection KC[t] at time t. In FIG. 8, a case is exemplified in which a vector PL[t2][t3] having the start point at the intersection KC[t2] and the end point at the intersection KC[t3] is perpendicular to the $Z_V$-axis. Furthermore, in a screen-change example shown in FIG. 9, a case is assumed in which the virtual straight line LC[t4] and the controlled object Op intersect each other at an intersection KC[t4] at time t4. However, in FIG. 9, an exemplified case is shown in which a vector PL[t3][t4] having the start point at the intersection KC[t3] and the end point at the intersection KC[t4] is not perpendicular to the $Z_V$-axis. Specifically, in the screen-change example, the vector PL[t3][t4] has a component in the $-Z_V$ direction.

As shown in FIGS. 7 to 9, a part of the message Ms, which is referred to as a display message Md, is displayed in the display region of the message board Bd. After that, a display range of the message Ms, the display range being a part of the message Ms and displayed in the display region, moves based on change in relative position between the virtual straight line LC and the controlled object Op. In other words, the display message Md displayed in the display region changes based on a change in relative position between the virtual straight line LC and the controlled object Op.

For the sake of clarity, "last line LMS[t]" will be defined by the last line of the message Ms displayed in the display region of the message board Bd at time t. Furthermore, in the following description, "vector PM[t−1][t]" will be defined by a vector directed from the last lines from the last line LMS[t−1] at time (t−1) before time t to the last line LMS [t] at the time t in the message Ms. For example, as shown in FIG. 10, a vector PM[t3][t4] is directed from the last line LMS[t3] at time t4 to the last line LMS[t4] at the time t3 in the message Ms.

In the embodiment, the vector PM[t−1][t] is determined based on the vector PL[t−1][t]. Specifically, in the embodiment, the vector PM[t−1][t] is determined as a vector representative of the $Z_V$-axis component of the vector PL[t−1][t], for example. In other words, in the embodiment, an exemplary case is assumed in which the message Ms is moveable in the $+Z_V$ direction or the $-Z_V$ direction. Hereafter, either the $+Z_V$ direction or the $-Z_V$ direction will be simply referred to as a $Z_V$-axis direction. As shown in FIG. 9, for example, the vector PM[t3][t4] is determined as a vector obtained by extracting the $Z_V$-axis component from the vector PL[t3][t4]. As described above, in the embodiment, the position of the message board Bd in the virtual space SP-V remains unchanged. Accordingly, it can be acknowledged that the last line LMS[t] being moved to a position according to the vector PM[t−1][t] as viewed by the last line LMS[t−1] due to change of the virtual straight line LC by the vector PL[t−1][t] means that the position of message Ms is moved by an opposite vector (−PM[t−1][t]) to the vector PM[t−1][t], in the virtual space SP-V.

2. Configuration of Terminal Apparatus

The configuration of the terminal apparatus 10 will be described below with reference to FIGS. 11 and 12.

Figure 11:
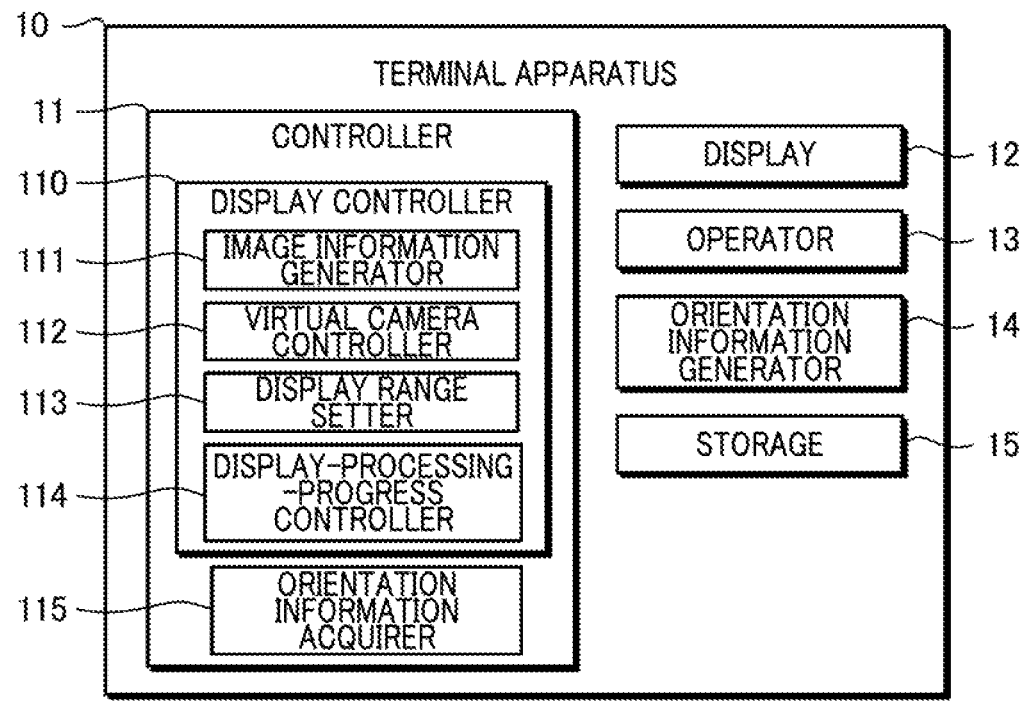
FIG. 11 is an exemplary block diagram for the configuration of a terminal apparatus 10.

FIG. 11 is an exemplary block diagram for the configuration of the terminal apparatus 10.

As shown in FIG. 11, the terminal apparatus 10 includes: the display 12 that displays an image; a controller 11 that controls each component of the terminal apparatus 10 and executes display processing for displaying the display image GH on the display 12; an operator 13 that receives an input operation carried out by the user U of the terminal apparatus 10; an orientation information generator 14 that detects a change in orientation of the terminal apparatus 10 and outputs orientation information B representative of a detection result; and a storage 15 that stores thereon various information including a control program PRG for the terminal apparatus 10.

In the embodiment, for example, a three-axis angular velocity sensor 1002 (see FIG. 9) is employed as the orientation information generator 14. Specifically, the orientation information generator 14 includes an X-axis angular velocity sensor that detects a change in orientation in the roll direction $Q_X$ per unit time, a Y-axis angular velocity sensor that detects a change in orientation in the pitch direction $Q_Y$ per unit time, and a Z-axis angular velocity sensor that detects a change in orientation in the yaw direction $Q_Z$. The orientation information generator 14 periodically outputs the orientation information B representative of detection results obtained by the X-axis angular velocity sensor, the Y-axis angular velocity sensor and the Z-axis angular velocity sensor.

The controller 11 includes an orientation information acquirer 115 (an example of an "acquirer") that acquires the orientation information B, and a display controller 110 that generates the display image GH based on the orientation information B.

The display controller 110 includes an image information generator 111, a virtual camera controller 112, a display range setter 113 and a display-processing-progress controller 114. The virtual camera controller 112 controls, based on the orientation information B, an orientation of the virtual camera CM in the virtual space SP-V. The image information generator 111 generates image information DS representative of the display image GH based on the result of an image captured by the virtual camera CM, and supplies the image information DS to the display 12 such that the image GH is displayed on the display 12. The display range setter 113 sets the display range of the message Ms, the display range being a part of the message Ms and displayed in the display region of the message board Bd, to display the display message Md in the display region. The display-processing-progress controller 114 controls progress of display processing.

Figure 12:
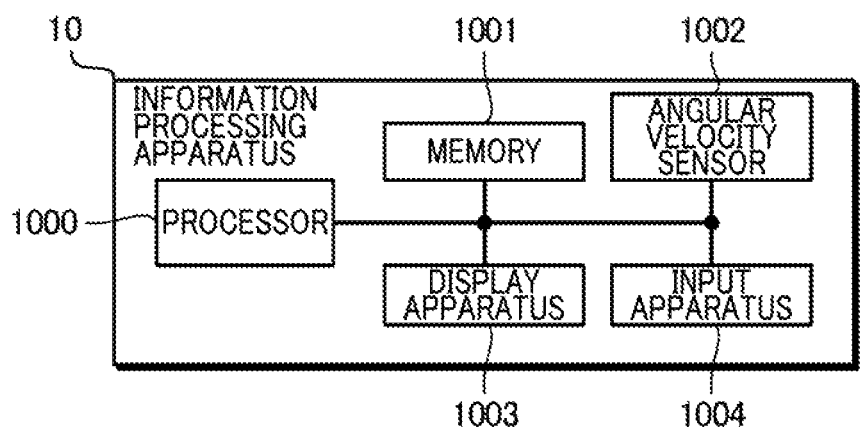
FIG. 12 is an example of a hardware configuration diagram for the terminal apparatus 10.

FIG. 12 is an example of a hardware configuration diagram for the terminal apparatus 10.

As shown in FIG. 12, the terminal apparatus 10 includes: a processor 1000 that controls each component of the terminal apparatus 10; a memory 1001 that stores thereon various information, the angular velocity sensor 1002 that detects a change in orientation of the terminal apparatus 10 and outputs a detection result representative of the orientation information B; a display apparatus 1003 that displays various images; and an input apparatus 1004 that accepts an input operation carried out by the user U of the terminal apparatus 10.

The memory 1001 is a non-transitory recording medium. For example, the memory 1001 includes either or both of the following: a volatile memory, such as Random Access Memory (RAM) or the like, which serves as a working area for the processor 1000; and a non-volatile memory, such as an Electrically Erasable Programmable Read-Only Memory (EEPROM) or the like, which is used for storing various information, such as the control program PRG or the like of the terminal apparatus 10. The memory 1001 serves as the storage 15. In the embodiment, the memory 1001 is exemplified as a "recording medium" in which the control program PRG is recorded. However, the present invention is not limited to such an aspect. The "recording medium" in which the control program PRG is recorded may be a storage provided in an external apparatus existing outside the terminal apparatus 10. For example, the "recording medium" in which the control program PRG is recorded may be a storage that is provided outside the terminal apparatus 10. The storage may be provided in a distribution server apparatus that has the control program PRG and distributes the control program PRG. The processor 1000 is, for example, a Central Processing Unit (CPU). The processor 1000 executes the control program PRG stored in the memory 1001, and operates according to the control program PRG, to serve as the controller 11. As described above, the angular velocity sensor 1002 includes the X-axis angular velocity sensor, the Y-axis angular velocity sensor, and the Z-axis angular velocity sensor. The angular velocity sensor 1002 serves as the orientation information generator 14. Both the display apparatus 1003 and the input apparatus 1004 are constituted of a touch panel, for example. The display apparatus 1003 serves as the display 12 and the input apparatus 1004 serves as the operator 13. The display apparatus 1003 and the input apparatus 1004 may be configured separately from each other. The input apparatus 1004 may be configured by one or more components including some or all of a touch panel, operation buttons, a keyboard, a joystick, and a pointing device, such as a mouse.

It is of note that the processor 1000 may be configured to include additional hardware, such as a Graphics Processing Unit (GPU), a Digital Signal Processor (DSP) or a Field Programmable Gate Array (FPGA) or the like, in addition to the CPU or in place of the CPU. In this case, some of or all of the functionality of the controller 11 realized by the processor 1000 may be realized by other hardware, such as a DSP or the like. The processor 1000 may be configured to further include some or all of the following: one or a plurality of CPUs; and one or a plurality of hardware elements. For example, in a case in which the processor 1000 may be configured to include a plurality of the CPUs, some or all of the features of the controller 11 may be realized by collaborative operation carried out by the plurality of the CPUs in accordance with the control program PRG.

3. Operation of Terminal Apparatus

Operation of the terminal apparatus 10 will be described below with reference to FIG. 13.

Figure 13:
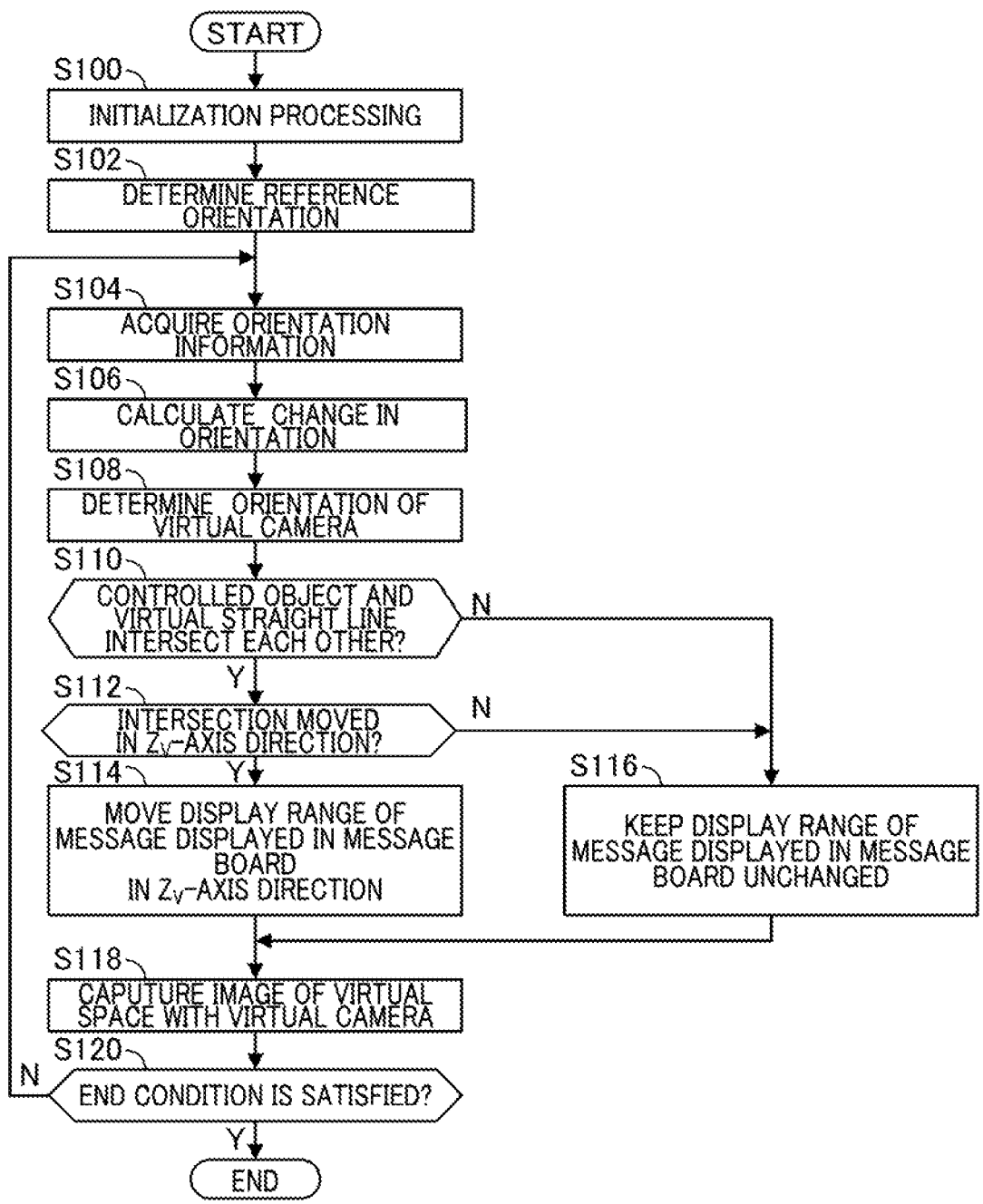
FIG. 13 is a flowchart showing an example of the operation of the terminal apparatus 10.

FIG. 13 is a flowchart showing an example of the operation of the terminal apparatus 10 when the terminal apparatus 10 executing the display processing for displaying the display image GH on the display 12. In the embodiment, when the user U inputs a predetermined starting operation for starting the display processing with the operator 13, the terminal apparatus 10 starts the display processing.

As shown FIG. 13, when the display processing is started, the display-processing-progress controller 114 executes an initialization processing (S100). Specifically, in the initialization processing at step S100, the display-processing-progress controller 114 disposes a message board Bd, a controlled object Op, environment components $E_V$, a character V and the like in the virtual space SP-V to the predetermined positions in the virtual space SP-V or to random positions in the virtual space SP-V. Furthermore, in the initialization processing at step S100, the display-processing-progress controller 114 sets an orientation of the virtual camera CM in the virtual space SP-V to the predetermined initial orientation. In the initialization processing at step S100, the display-processing-progress controller 114 determines the content of the display message Md such that the predetermined display range of the message Ms is displayed in the display region of the message board Bd.

Subsequently, the display-processing-progress controller 114 determines the time at which the initialization processing has been completed as the reference time t0, and determines the orientation of the HMD 1 at the reference time t0 as a "reference orientation" (S102). At step S102, the display-processing-progress controller 114 determines the apparatus coordinate system $\Sigma_S$ at the reference time t0 as the reference apparatus coordinate system $\Sigma_{S0}$. Furthermore, at step S102, the display-processing-progress controller 114 sets the camera coordinate system $\Sigma_C$ such that the direction of each coordinate axis of the camera coordinate system $\Sigma_C$ is the same as that of each coordinate axis of the apparatus coordinate system $\Sigma_S$ when viewed by the user U wearing the HMD 1. After that, at step S102, the display-processing-progress controller 114 determines the camera coordinate system $\Sigma_C$ at the reference time t0 as the reference camera coordinate system $\Sigma_{C0}$. In the following description, the virtual straight line LC at the reference time t0 will be referred to as a reference straight line LC0.

Subsequently, the orientation information acquirer 115 acquires the orientation information B from the orientation information generator 14 (S104).

After that, the virtual camera controller 112 calculates, based on the orientation information B acquired by the orientation information acquirer 115 at step S104, change dB in orientation from the reference orientation of the HMD 1 (S106). In the embodiment, for example, the change dB in orientation obtained by the virtual camera controller 112 is described by the rotational axis $W_S$ viewed by the reference apparatus coordinate system $\Sigma_{S0}$ and the angle $\theta_W$ around the rotational axis $W_S$. In other words, in the embodiment, when the HMD 1 rotates around the rotational axis $W_S$ by the angle $\theta_W$ as viewed by the reference apparatus coordinate system $\Sigma_{S0}$, the change dB in orientation includes a direction vector representative of the rotational axis $W_S$ in the reference apparatus coordinate system $\Sigma_{S0}$ and the angle $\theta_W$. However, the change dB in orientation may be described by any other expression method. For example, the change dB in orientation may be described by orientation conversion matrix indicating change in orientation from the reference apparatus coordinate system $\Sigma_{S0}$ to the apparatus coordinate system $\Sigma_S$, or may be described by quaternions indicative of a change in orientation from the reference apparatus coordinate system $\Sigma_{S0}$ to the apparatus coordinate system $\Sigma_S$. In the following description, when the HMD 1 rotates around the rotational axis $W_S$ by the angle $\theta_W$, this angle $\theta_W$ will be occasionally referred to as "an amount of change in orientation".

Subsequently, the virtual camera controller 112 determines, based on the change dB in orientation calculated at step S106, the orientation of the virtual camera CM in the virtual space SP-V (S108). Specifically, at step S108, first, the virtual camera controller 112 sets the rotational axis $W_C$ and the angle $\theta_C$, based on the rotational axis $W_S$ and the angle $\theta_W$ indicating the change dB in orientation calculated at step S106. Subsequently, the virtual camera controller 112 sets the camera coordinate system $\Sigma_C$ as a coordinate system obtained by rotating the reference camera coordinate system $\Sigma_{C0}$ around the rotational axis $W_C$ by the angle $\theta_C$, to determine the orientation of the virtual camera CM. In other words, at step S108, the virtual camera controller 112 sets the virtual straight line LC as a straight line obtained by rotating the reference straight line LC0 around the rotational axis $W_C$ by the angle $\theta_C$. For example, when the HMD 1 rotates by the angle $\theta_W$ around the ZS axis from the reference orientation relative to the yaw direction $Q_Z$, the virtual camera controller 112 sets the camera coordinate system $\Sigma_C$ as a coordinate system having an orientation obtained by rotating the reference camera coordinate system $\Sigma_{C0}$ around the $Z_C$ axis by the angle $\theta_W$, to determine the orientation of the virtual camera CM. Furthermore, for example, when the HMD 1 rotates by the angle $\theta_W$ around the $Y_S$-axis from the reference orientation relative to the pitch direction $Q_Y$, the virtual camera controller 112 sets the camera coordinate system $\Sigma_C$ as a coordinate system having an orientation obtained by rotating the reference camera coordinate system $\Sigma_{C0}$ around the $Y_C$-axis by the angle $\theta_W$, to determine the orientation of the virtual camera CM. Furthermore, for example, when the HMD 1 rotates by the angle $\theta_W$ around the $X_S$-axis from the reference orientation relative to the roll direction $Q_X$, the virtual camera controller 112 sets the camera coordinate system $\Sigma_C$ as a coordinate system having an orientation obtained by rotating the reference camera coordinate system $\Sigma_{C0}$ around the $X_C$-axis by an angle $\theta_W$, to determine the orientation of the virtual camera CM.

Subsequently, the display range setter 113 determines whether the virtual straight line LC intersects with the controlled object Op in the virtual space SP-V (an example of "a predetermined positional relationship is established") (S110). Alternatively, at step S110, the display range setter 113 may determine whether the direction in which the virtual straight line LC extends viewed by the virtual camera CM is included in the direction of the controlled object Op viewed by the virtual camera CM (another example of "a predetermined positional relationship is established").

When the result of the determination at step S110 is affirmative, the display range setter 113 determines whether the intersection KC of the virtual straight line LC with the controlled object Op has moved in the $Z_V$-axis direction (S112). Specifically, at step S112, first, the display range setter 113 calculates a vector PL[t−1][t] having the start point and the end point. Here, the start point is at an intersection KC[t−1] of the virtual straight line LC[t−1] with the controlled object Op at time (t−1) before the current time t by the predetermined time period. The end point is at an intersection KC[t] of the virtual straight line LC[t] with the controlled object Op at time t. Subsequently, the display range setter 113 determines whether the vector PL[t−1][t] has the $Z_V$-axis component.

When the result of the determination at step S112 is affirmative, the display range setter 113 moves a display range of the message Ms, the display range being a part of the message Ms and displayed in the display region of the message board Bd (S114). In other words, when the result of the determination at step S112 is affirmative, the display range setter 113 moves the position of unit display information in the display region. The unit display information is constituted of text of the message Ms and is displayed in the display region of the message board Bd. That is, in the embodiment, when the result of the determination at step S112 is affirmative, the display range setter 113 moves the position, in the virtual space SP-V, of the text. The text is a portion of the message Ms displayed in the display region of the message board Bd. Specifically, at step S114, first, the display range setter 113 determines the vector PM[t−1][t] based on the vector PL[t−1][t] calculated at step S112. Subsequently, the display range setter 113 moves the message Ms at time (t−1) by the vector (−PM[t−1][t]) in the virtual space SP-V, to determine a display range of the message Ms at time t, the display range being a part of the message Ms and displayed in the display region of the message board Bd.

Conversely, when the result of the determination at step S110 or S112 is negative, the display range setter 113 determines, without moving the message Ms at time (t−1), the display range of the message Ms at time t, the display range being a part of the message Ms and displayed in the display region of the message board Bd (S116).

Subsequently, the image information generator 111 generates image information DS representative of a result of capturing an image of the virtual space SP-V by the virtual camera CM, and supplies the image information DS to the display 12, to cause the display 12 to display the display image GH (S118).

Subsequently, the display-processing-progress controller 114 determines whether the predetermined input operation of ending the display processing has been carried out by the user U using the operator 13 (S120). After that, when the result of the determination at step S120 is negative, the display-processing-progress controller 114 moves the processing to step S104. When the result of the determination at step S120 is affirmative, the display-processing-progress controller 114 ends the display processing.

4. Summary of Embodiment

In the foregoing description, according to the embodiment, when the intersection KC of the virtual straight line LC with the controlled object Op moves in the $Z_r$-axis direction, the display range setter 113 moves the display range of the message Ms, the display range being a part of the message Ms and displayed in the display region of the message board Bd. In other words, according to the embodiment, the display range setter 113 moves the display range of the message Ms, the display range being a part of the message Ms and displayed in the display region of the message board Bd, when the user U wearing the HMD 1 changes the orientation of the HMD 1 in the pitch direction $Q_Y$ in the state in which the virtual straight line LC and the controlled object Op intersect each other. Furthermore, according to the embodiment, the virtual camera controller 112 changes the orientation of the virtual camera CM based on the change dB in orientation of the HMD 1. In other words, according to the embodiment, the virtual camera controller 112 changes the range in the virtual space SP-V to be displayed on the display 12 when the user U wearing the HMD 1 changes the orientation of the HMD 1. In summary, according to the embodiment, the user U wearing the HMD 1 changes the orientation of the HMD 1 whereby the user U can carry out both of the following: an input operation to change the range of the virtual space SP-V, the range being displayed on the display 12; and an input operation to change the display range of the message Ms, the display range being a part of the message Ms and displayed in the display region of the message board Bd. For this reason, according to the embodiment, the user U wearing the HMD 1 is able to carry out inputs of various instructions by changing the orientation of the HMD 1.

B. Modifications

Each of the embodiments described above can be variously modified. Specific modification modes will be described below as examples. Two or more modes, freely selected from the following examples can be appropriately combined within a range, as long as they do not conflict with each other. In the modifications described below, elements with substantially the same operational actions or functions as those in the embodiments are denoted by the same reference signs as in the above description, and detailed description thereof will not be presented, as appropriate.

Modification 1

In the embodiment described above, the display range setter 113 moves the display range of the message Ms, the display range being a part of the message Ms and displayed in the display region of the message board Bd, under the condition in which the intersection KC of the virtual straight line LC with the controlled object Op moves in the $Z_r$-axis direction. However, the present invention is not limited to such an aspect. The display range setter 113 may move the display range of the message Ms, the display range being a part of the message Ms, and displayed in the display region of the message board Bd, when a movement start condition (an example of a "predetermined condition") is satisfied in addition to moving the intersection KC of the virtual straight line LC with the controlled object Op in the $Z_r$-axis direction.

Figure 14:
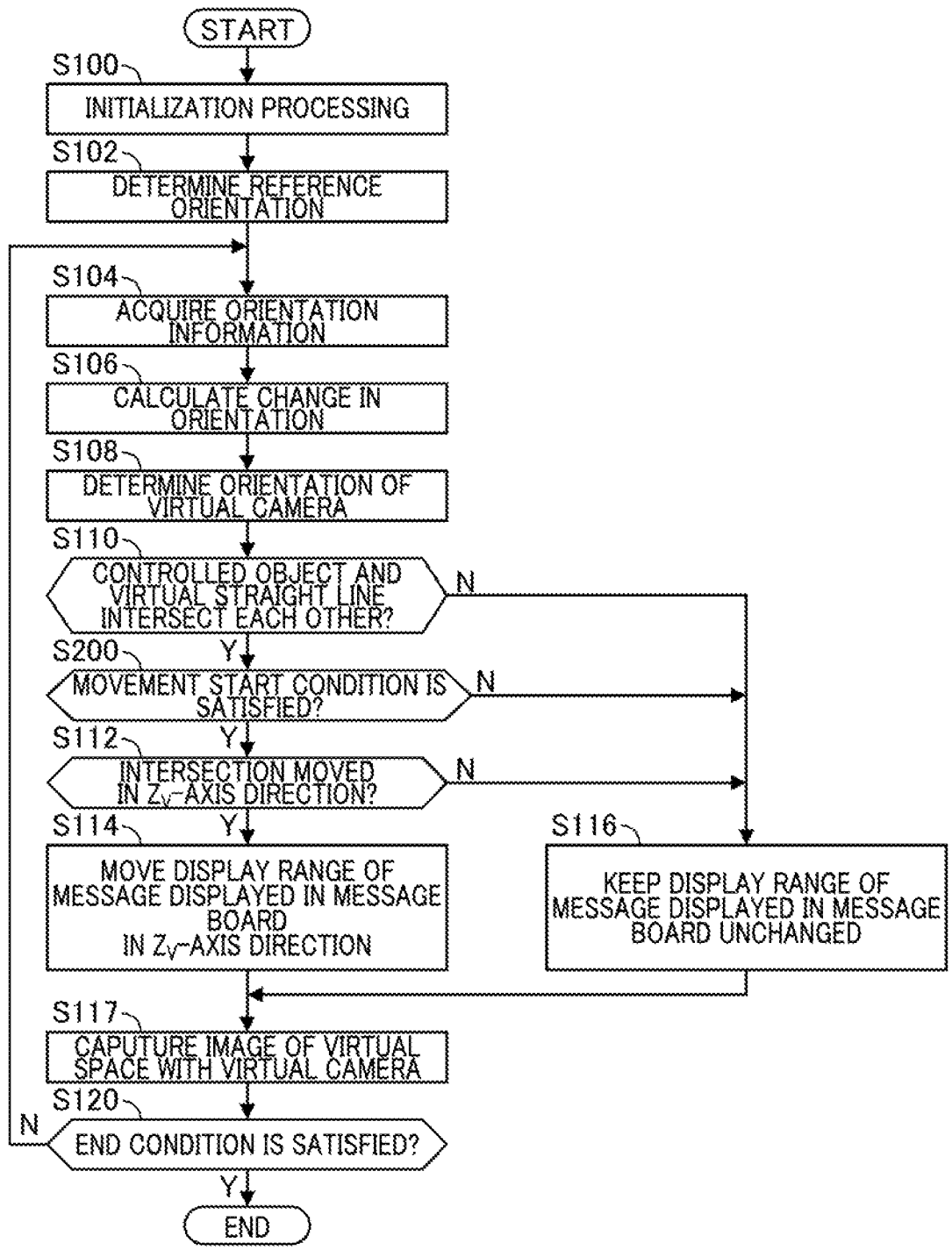
FIG. 14 is a flowchart showing an example of operation of the terminal apparatus 10 according to modification 1.

FIG. 14 is a flowchart showing an example of operation of the terminal apparatus 10 when the terminal apparatus 10 executes display processing according to the modification. The flowchart shown in FIG. 14 is identical to that shown in FIG. 13 except that the controller 11 executes the process at step S200.

As shown in FIG. 14, when the virtual straight line LC and the controlled object Op intersect each other (S110; Y), the display range setter 113 determines whether the movement start condition is satisfied (S200). After that, when the result of the determination at step S200 is affirmative, the display range setter 113 moves the processing to step S112. Conversely, when the result of the determination at step S200 is negative, the display range setter 113 moves the processing to step S116.

In the modification, it is presumed that after the virtual straight line LC and the controlled object Op begin to intersect each other, the intersection KC of the virtual straight line LC with the controlled object Op remains stationary for a threshold duration or longer. Here, "it can be presumed that the intersection KC of the virtual straight line LC with the controlled object Op remains stationary for a threshold duration or longer" is intended to indicate that, when the threshold duration is set to, for example, a determination period, a distance between the position of the intersection KC at the starting time of the determination period and the position of the intersection KC at any time in the determination period is equal to or less than a predetermined distance. In the modification, when a state in which the virtual straight line LC and the controlled object Op intersect each other changes to a state in which they do not intersect after the movement start condition is satisfied, the movement start condition also changes to a state in which it is not satisfied. In other words, in the modification, in order to move the display range of the message Ms, the display range being a part of the message Ms and displayed in the display region of the message board Bd, the movement start condition is required to be satisfied every time the virtual straight line LC and the controlled object Op begin to intersect each other.

Figure 15:
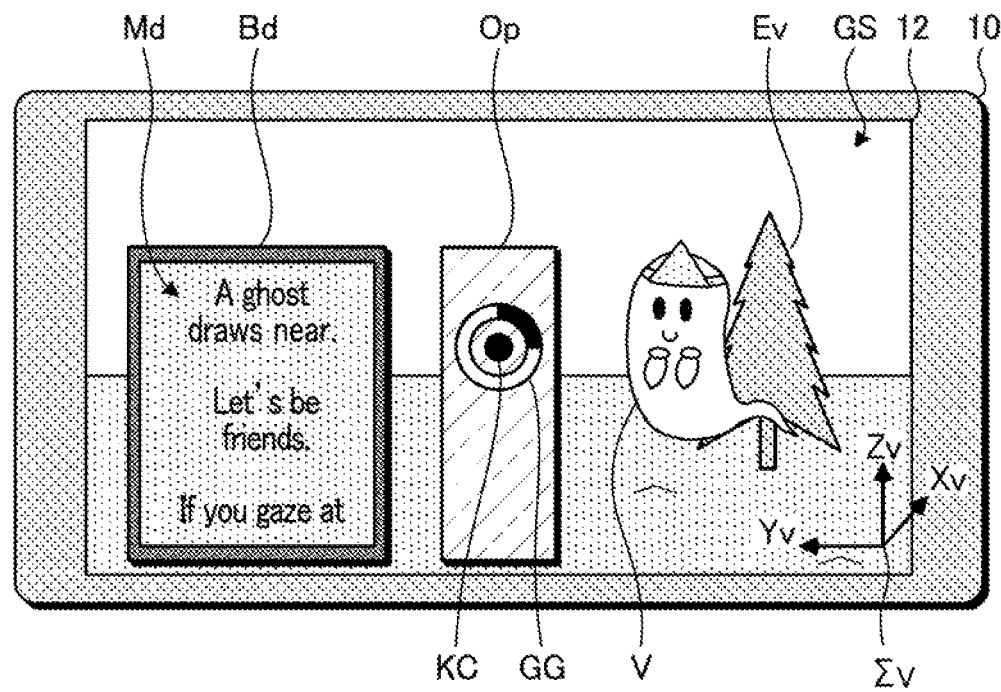
FIG. 15 is an explanatory diagram for an example of a visible image GS according to modification 1.

FIG. 15 shows an example of a visible image GS according to the present modification. In the modification, as shown in FIG. 15, when it can be presumed that the intersection KC of the virtual straight line LC with the controlled object Op remains stationary, and in turn the determination period has started, the display range setter 113 displays a gauge image GG as an object disposed in the virtual space SP-V. The gauge image GG is an image representative of a time length until the end of the determination period in the visible image GS.

Figure 16:
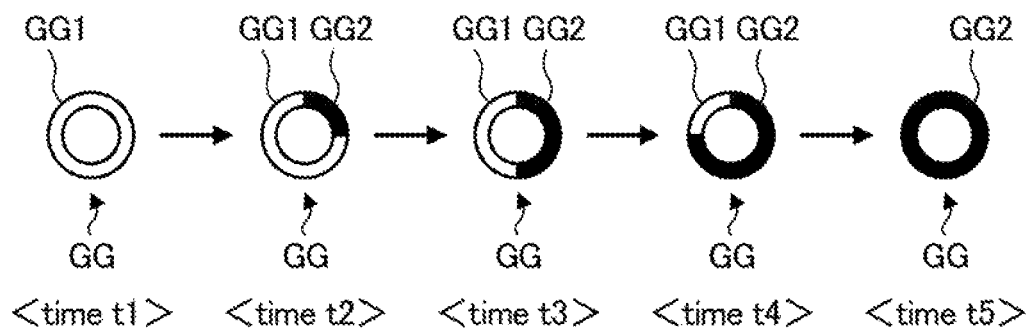
FIG. 16 is an explanatory diagram of an example of a display mode of a gauge image GG.

FIG. 16 is an explanatory diagram for an example of a gauge image GG according to the modification. In the modification, as shown in FIG. 16, the display range setter 113 changes the display mode of the gauge image GG over time. Specifically, in the modification, the gauge image GG includes at least any one of the following: an image GG1 representative of a time length from the current time to the end time of the determination period; and an image GG2 representative of a time length from the start of the determination period to the current time. In the determination period, the display range setter 113 decreases the ratio of the image GG1 to the gauge image GG over time and increases the ratio of the image GG2 to the gauge image GG over time. As shown in FIG. 16, an exemplary case is assumed in which the determination period starts at time t1 and ends at time t5. In this case, the display range setter 113 fills all of the entire gauge image GG with the image GG1 at time t at which the determination period starts. After that, the display range setter 113 increases the ratio of the image GG2 to the gauge image GG as the time progresses from time t2 to time t3, and from t3 to time t4. The display range setter 113 fills the entire gauge image GG with the image GG2 at time t5 at which the determination period ends. For this reason, in an example of FIG. 16, the user U wearing the HMD 1 is able to visually know the remaining time of the determination period from the gauge image GG.

In the modification, the movement start condition is defined as "it can be presumed that the intersection KC remains stationary for a threshold duration or longer." However, the present invention is not limited to such an aspect. The movement start condition may be defined as "the HMD 1 is inclined by a predetermined angle or more in the roll direction $Q_X$ compared to the reference orientation", for example.

In the foregoing description, according to the modification, when the movement start condition is satisfied, the display range of the message Ms, the display range being a part of the message Ms and displayed in the display region of the message board Bd, is moved. For this reason, the modification enables prevention of moving the display range of the message Ms, the display range being a part of the message Ms and displayed in the display region of the message board Bd, due to an incorrect input operation of the user U wearing the HMD 1.

Modification 2

In the embodiment and the modification, the display range setter 113 defines a vector having the $Z_V$-axis component of the vector PL[t−1][t] as the vector PM [t−1][t]. However, the present invention is not limited to such an aspect. The display range setter 113 may define, as a vector PM[t−1][t], a vector obtained by a linear combination of the following: a vector having the $Z_V$-axis component of the vector PL[t−1][t]; and a vector having the $Y_V$-axis component of the vector PL[t−1][t], for example.

Specifically, for example, when a vector obtained by extracting the $Z_V$-axis component of the vector PL[t−1][t] is defined as a vector PL-Z[t−1][t], and a vector obtained by extracting the $Y_V$-axis component of the vector PL[t-1][t] is defined as a vector PL-Y[t−1][t], the vector PM[t−1][t] may be described by the following Equation (1).

$$PM[t-1][t]=\alpha*(PL-Z[t-1][t])+\beta*(PL-Y[t-1][t]) \quad (1)$$

Here, the coefficients $\alpha$ and $\beta$ in Equation (1) represent positive real numbers. For example, the coefficients $\alpha$ and $\beta$ may represent real numbers that satisfy the relationship "$\alpha=\beta=1$."

Figure 17:
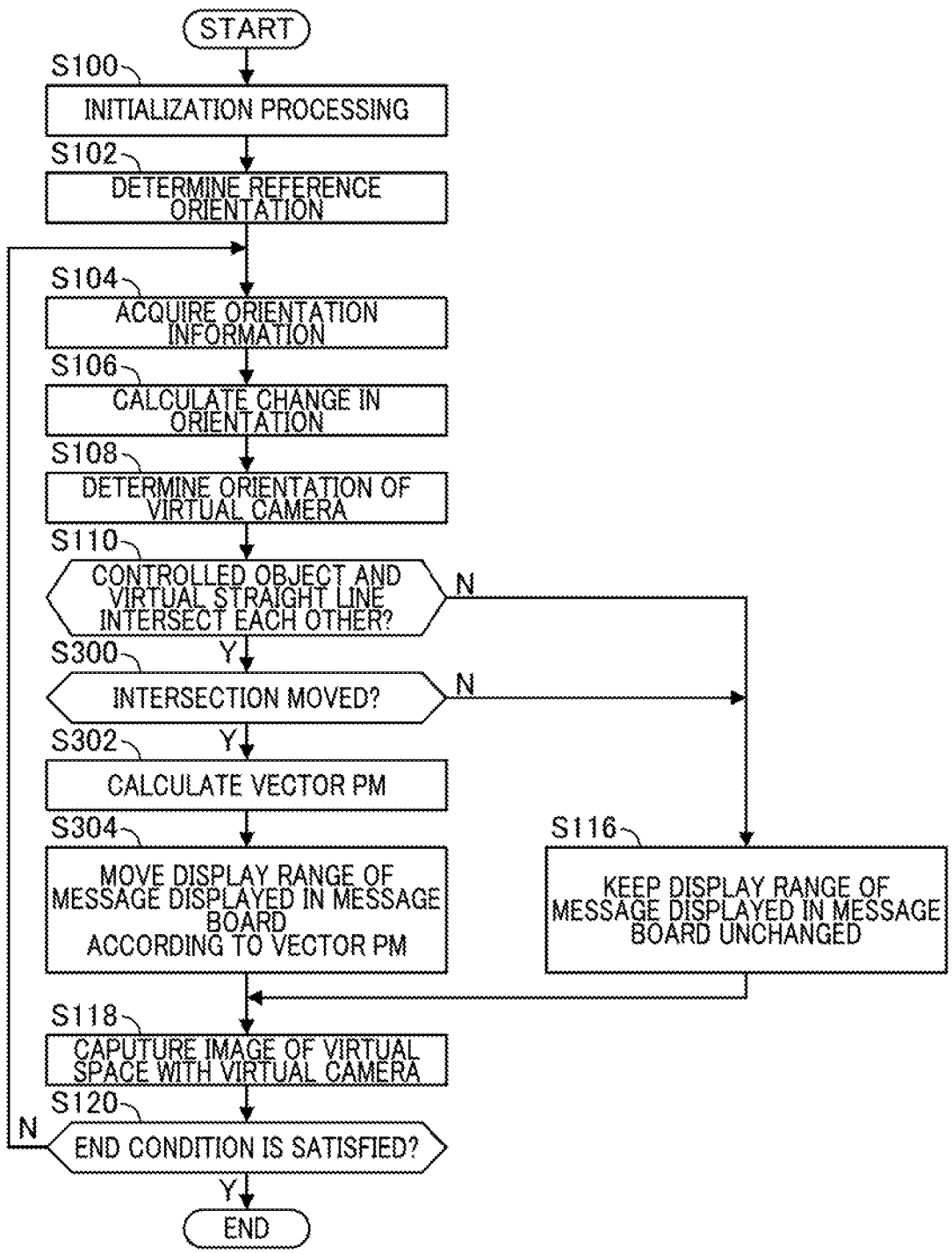
FIG. 17 is a flowchart showing an example of an operation of the terminal apparatus 10 according to modification 2.

FIG. 17 is a flowchart showing an example of the operation of the terminal apparatus 10 when the terminal apparatus 10 executes the display processing according to the modification. The flowchart shown in FIG. 17 is identical to that shown in FIG. 13 except that processing at step 300 is executed by the controller 11 instead of step S112, processing at step S302 is executed by the controller 11, and processing at step S304 is executed by the controller 11 instead of step S114.

As shown in FIG. 17, when the virtual straight line LC and the controlled object Op intersect each other (Y: at S110), the display range setter 113 determines whether the intersection KC of the virtual straight line LC with the controlled object Op has moved (S300). After that, the result of the determination at step S300 is affirmative, the display range setter 113 moves the processing to step S302. Conversely, the result of the determination at step S300 is negative, the display range setter 113 moves the processing to step S116. Subsequently, the display range setter 113 calculates, based on the vector PL[t−1][t] representative of the movement of the intersection KC that has been determined at step S300 and the Equation (1) described above, a vector PM[t−1][t] representative of a movement of the display range of the message Ms, the display range being a part of the message Ms and displayed in the display region (S302). After that, the display range setter 113 moves, based on the vector PM[t−1][t] calculated at step S302, the display range of the message Ms, the display range being a part of the message Ms and displayed in the display region. (S304).

Figure 18:
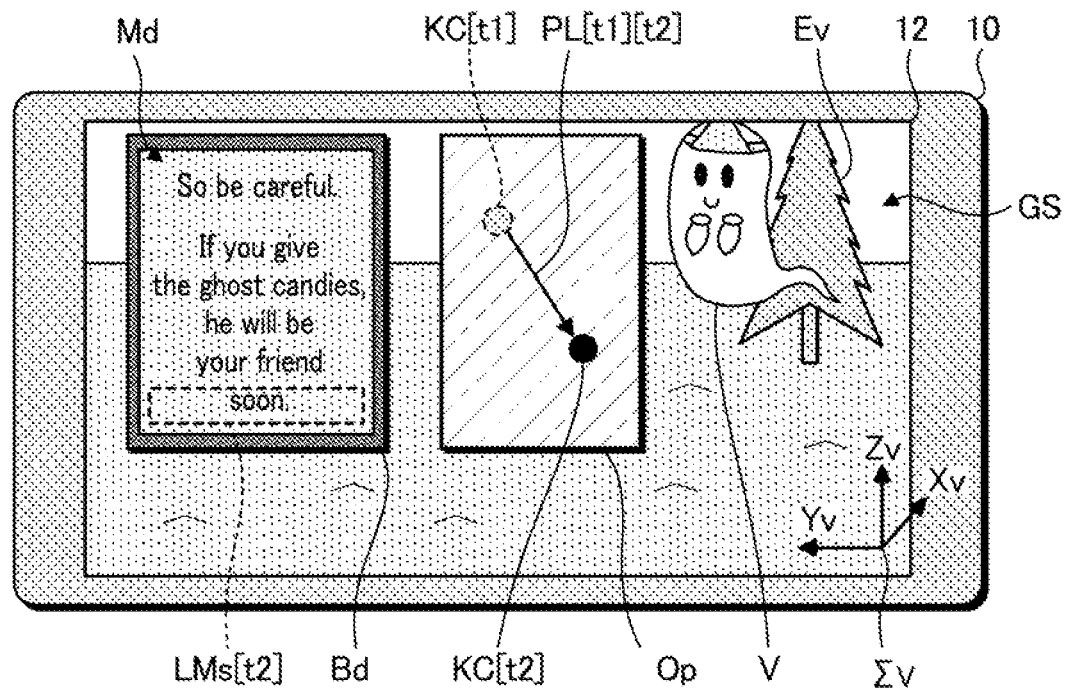
FIG. 18 is an explanatory diagram for an example of a visible image GS according to modification 2.
Figure 19:
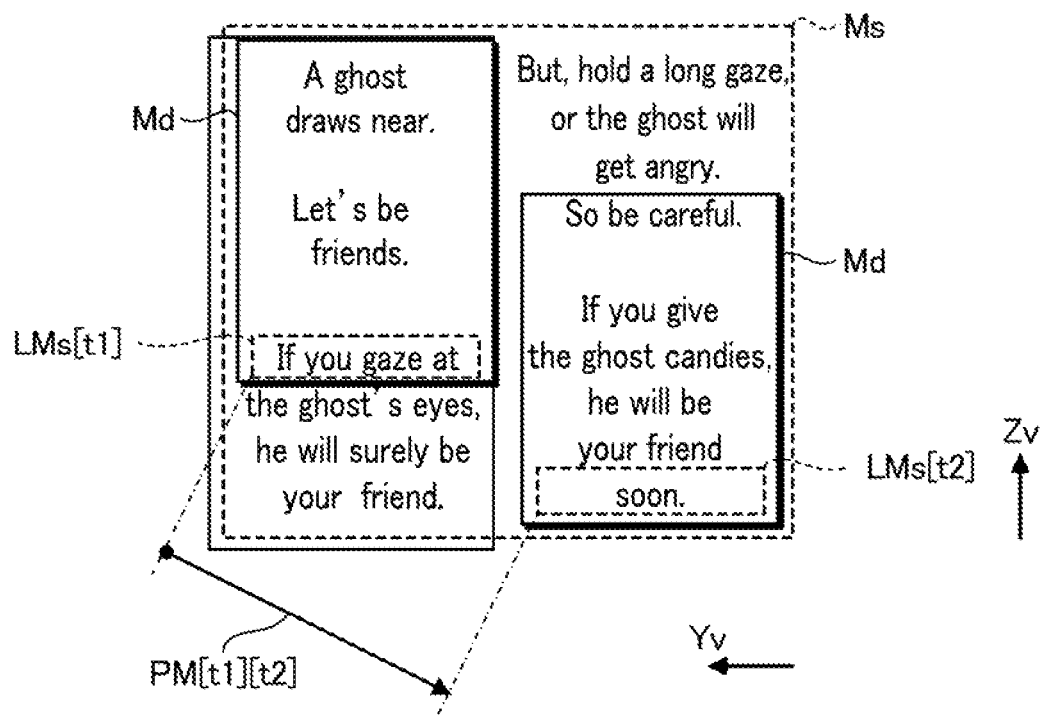
FIG. 19 is an explanatory diagram for an example of a relationship between a message Ms and a display message Md according to modification 2.

FIG. 18 is an explanatory diagram of a vector PL representative of the movement of the intersection KC in the visible image GS according to the modification. FIG. 19 is an explanatory diagram for a vector PM representative of the movement of the display range of the message Ms, the display range being a part of the message Ms and displayed in the display region, when the vector PL has the direction shown in FIG. 18. In FIGS. 18 and 19, a case is assumed in which the virtual straight line LC[t1] and the controlled object Op intersect each other at the intersection KC[t1] at time t1, and the virtual straight line LC[t2] and the controlled object Op intersect each other at the intersection KC[t2] at time t2. Furthermore, in FIGS. 18 and 19, a case is assumed in which a vector PL[t1][t2] representative of the intersection KC[t2] from the intersection KC[t1] has the $Z_V$-axis component and the $Y_V$-axis component. In this case, as shown in FIG. 19, the vector PM[t1][t2] has the $Z_V$-axis component and the $Y_V$-axis component, and represents from the last line LMS[t1], which is in the message Ms, to be displayed in the display region at time t1, to the last line LMS[t2], which is a portion of the message Ms, to be displayed in the display region at time t2. Accordingly, the display range setter 113 can move the message Ms in the $Z_V$-axis direction in the virtual space SP-V, and can move the message Ms in the +$Y_V$-direction or the −$Y_V$-direction. Hereafter, either the +$Y_V$-direction or the −$Y_V$-direction will be simply referred to as a $Y_V$-axis direction.

In the foregoing description, in the modification, the display range setter 113 can move the message Ms in both the $Z_V$-axis direction and the $Y_V$-axis direction. In other words, according to the modification, the user U wearing the HMD 1 is able to carry out the move of the message Ms by a change in orientation of the HMD 1 in the yaw direction $Q_Z$, in addition to the move of the message Ms by change in orientation of the HMD 1 in the pitch direction $Q_Y$. For this reason, the user U wearing the HMD 1 is able to change flexibly the display range of the message Ms, the display range being a part of the message Ms displayed in the display region of the message board Bd, as compared to a case in which the display range setter 113 moves the message Ms only in the $Z_V$-axis direction.

Modification 3

In the foregoing embodiment and modifications, the display range setter 113 moves the display range of the message Ms, the display range being a part of the message Ms and displayed in the display region, based on the vector PL representative of the movement of the intersection KC of the virtual straight line LC with the controlled object Op. However, the present invention is not limited to such an aspect. For example, the display range setter 113 may determine, based on the position of the intersection KC in the controlled object Op, the display range of the message Ms, the display range being a part of the message Ms and displayed in the display region.

Figure 20:
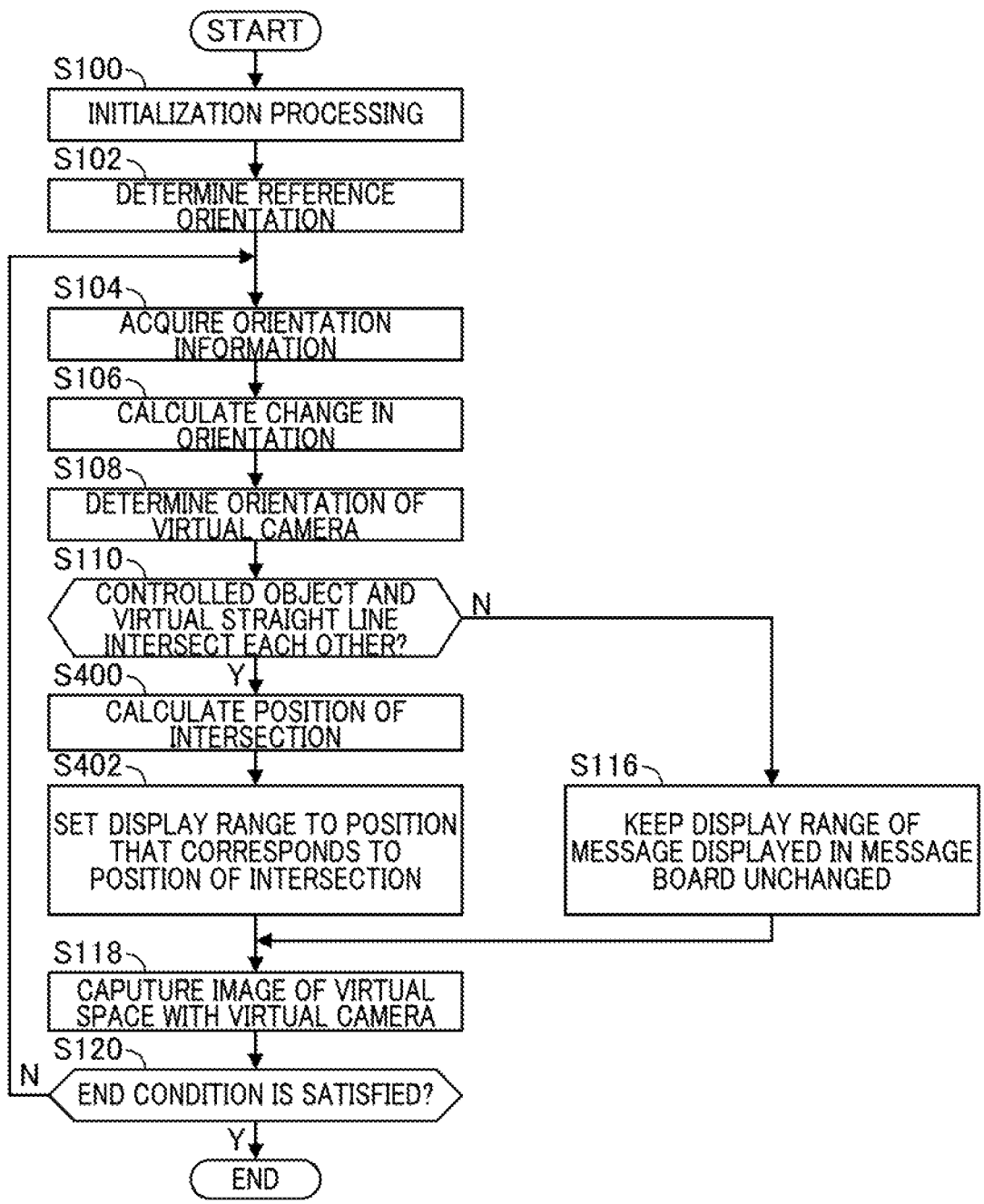
FIG. 20 is a flowchart showing an example of the operation of the terminal apparatus 10 according to modification 3.

FIG. 20 is a flowchart showing an example of the operation of the terminal apparatus 10 when the terminal apparatus 10 executes the display processing according to the modification. The flowchart shown in FIG. 20 is identical to that in show in FIG. 13 except that processing at step S400 is executed by the controller 11 instead of step S112, processing at step 402 is executed by the controller 11 instead of step S114. As shown in FIG. 20, when the virtual straight line LC and the controlled object Op intersect each other (Y: at S110), the display range setter 113 calculates a position of the intersection KC of the virtual straight line LC with the controlled object Op (S400). Subsequently, the display range setter 113 sets, based on the position of the intersection KC calculated in step S400, the display range of the message Ms, the display range being a part of the message Ms and displayed in the display region (S402).

Figure 21:
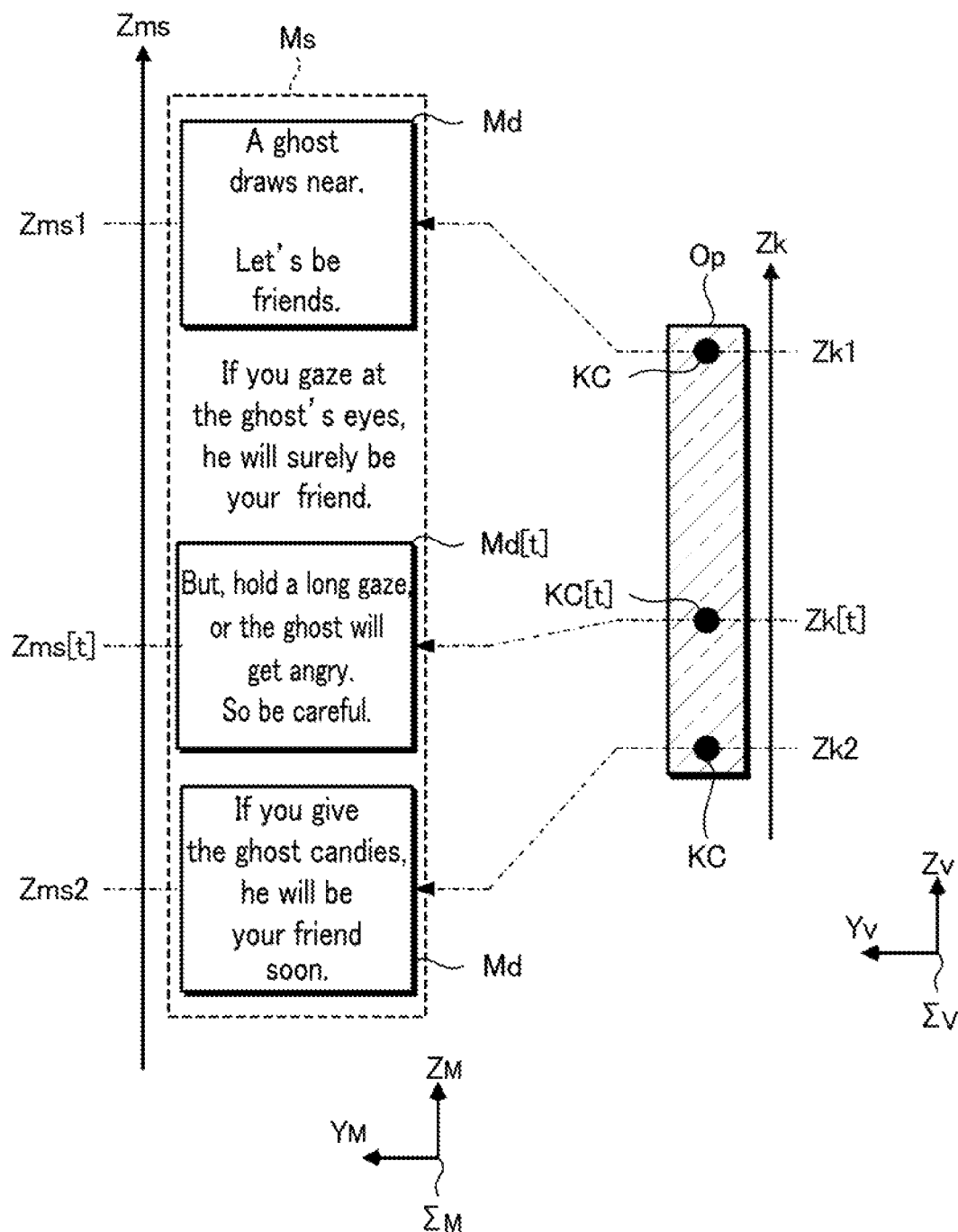
FIG. 21 is an explanatory diagram of an example of a relationship between an intersection KC and the display message Md according to modification 3.

FIG. 21 is an explanatory diagram of the relationship between the position of the intersection KC of the virtual straight line LC with the controlled object Op and the display range of the message Ms, the display range being a part of the message Ms and displayed in the display region, according to the modification. In FIG. 21, for the sake of clarity, the position of the intersection KC in the $Z_V$-axis direction will be described as a position Zkn. In the following description, when the position Zk of the intersection KC is located closest to the $+Z_V$ side of the controlled object Op, this position Zk of the intersection KC is referred to as a position Zk1. In the following description, when the position Zk of the intersection KC is located closest to the $-Z_V$ side of the controlled object Op, this position Zk of the intersection KC is referred to as a position Zk2. In FIG. 21, for the sake of clarity, a message coordinate system $\Delta_M$ representative of a position in the message Ms will be introduced. Here, the message coordinate system $\Delta_M$ is a coordinate system in which the origin is provided at a predetermined position of the message Ms or at a position where the relative position to the message Ms has a predetermined relationship. The message coordinate system $\Delta_M$ has a $Z_M$-axis that is parallel to the $Z_V$-axis and a $Y_M$-axis that is parallel to the $Y_V$ axis. In the following description, either the $+Z_M$ direction or the $-Z_M$ direction will be simply referred to as a Z-axis direction. Furthermore, for the sake of clarity, the position of the display message Md in the message Ms will be referred to as "a position Zms." In the following description, when the display message Md is located closest to the $+Z_M$ side of the message Ms, this position Zms of the display message Md is referred to as a position Zms1. In the following description, when the display message Md is located closest to the $-Z_M$ side of the message Ms, this position Zms of the display message Md is referred to as a position Zms2.

As shown in FIG. 21, in the modification, when the intersection KC exists at the position Zk 1, the display range setter 113 sets the display message Md to the position Zms1. When the intersection KC exists at the position Zk2, the display range setter 113 sets the display message Md to the position Zms2. After that, when the intersection KC[t] is positioned at the position Zk[t] at time t after the reference time t0, the display range setter 113 determines, based on the position Zk[t], the position Zms[t] of the display message Md[t] in the message Ms. For example, the display range setter 113 may determines the position Zms[t] such that the following (4-i) and (4-ii) are the same:

(4-i) the ratio of (a) a distance from the position Zk[t] to the position Zk1 to (b) a distance from the position Zk[t] to the position Zk2; and (4-ii) the ratio of (c) a distance from the position Zms[t] to the position Zms1 to (d) a distance from the position Zms to the position Zms2.

In the foregoing description, according to the modification, the user U wearing the HMD 1 is able to directly specify the position Zms of the display message Md in the message Ms using the position Zk of the intersection KC of the virtual straight line LC with the controlled object Op. For this reason, the modification allows for the user U wearing the HMD 1 to provide, on the message board Bd, a prompt displaying of a desired display range of the message Ms.

In the modification, an exemplary case is shown in which in the virtual space SP-V, the controlled object Op for specifying the position of the display message Md in the $Z_M$-axis direction is provided. However, the present invention is not limited to such an aspect. For example, in the virtual space SP-V, there may be provided: one controlled object Op for specifying the position of the display message Md in the $Z_M$-axis direction; and another controlled object Op for specifying the position of the display message Md in the $Y_M$-axis direction.

Modification 4

In the foregoing embodiment and the modification 1, the length of the vector PM is determined based on the vector PL representative of the movement of the intersection KC. Here, the vector PM is defined by the movement of the display range of the message Ms, the display range being a part of the message Ms and displayed in the display region. However, the present invention is not limited to such an aspect. For example, the display range setter 113 may determine the length of the vector PM based on the vector PL and the position of the intersection KC in the controlled object Op.

Figure 22:
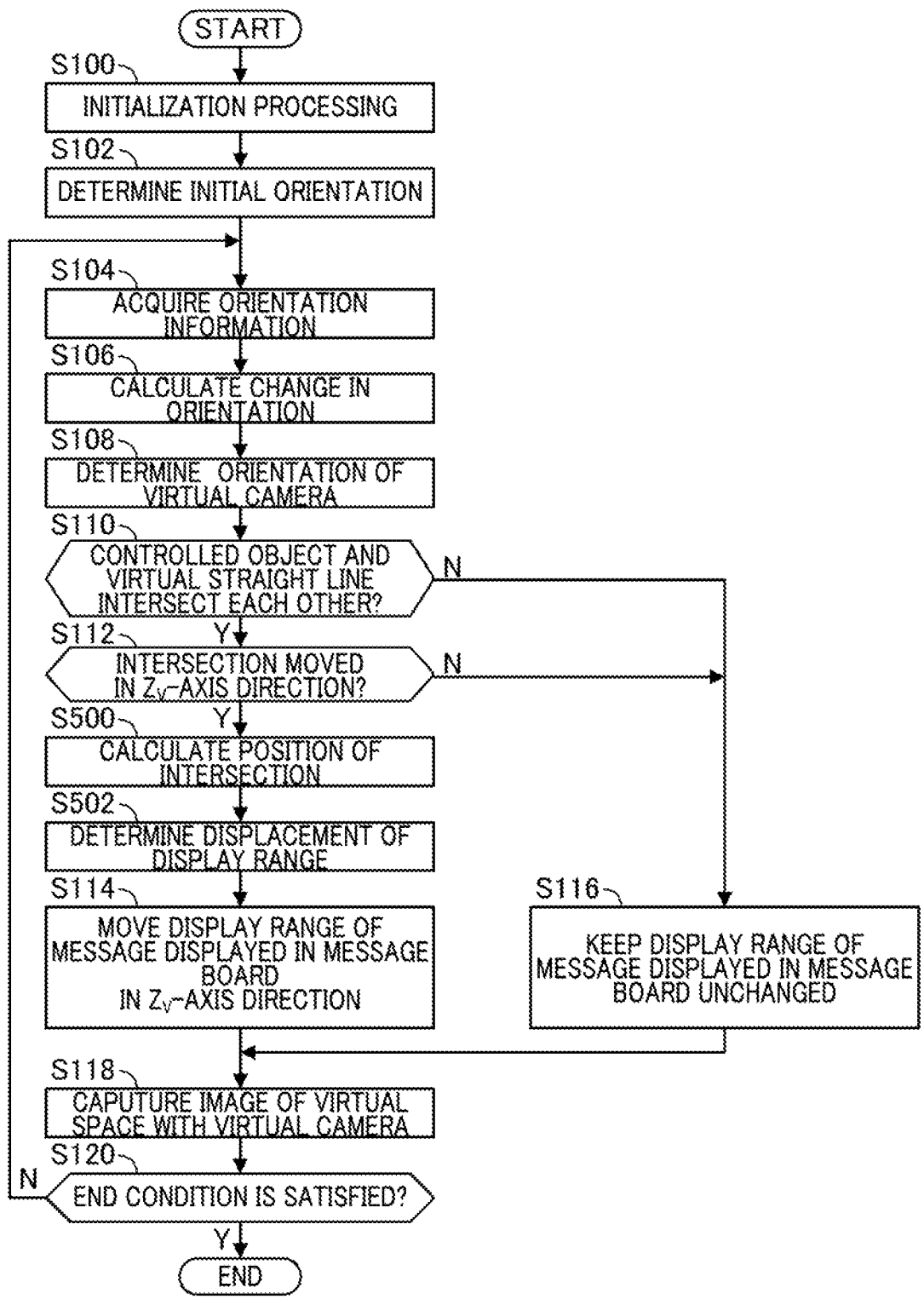
FIG. 22 is a flowchart showing an example of an operation of the terminal apparatus 10 according to modification 4.

FIG. 22 is a flowchart showing an example of the operation of the terminal apparatus 10 when the terminal apparatus 10 executes the display processing according to the modification. The flowchart shown in FIG. 22 is identical to that in show in FIG. 13 except that processing at steps S500 and S502 is executed by the controller 11. As shown in FIG. 22, when the intersection KC of the virtual straight line LC with the controlled object Op moves in the $Z_V$ axis direction (S112; Y), the display range setter 113 calculates the position of the intersection KC of the virtual straight line LC with the controlled object Op (S500). Subsequently, based on the position of the intersection KC calculated at step S500 and the vector PL calculated at step S112, the display range setter 113 determines the length of the vector PM, that is, an amount to move the display range that is a part displayed in display region, of the message Ms (S502).

Figure 23:
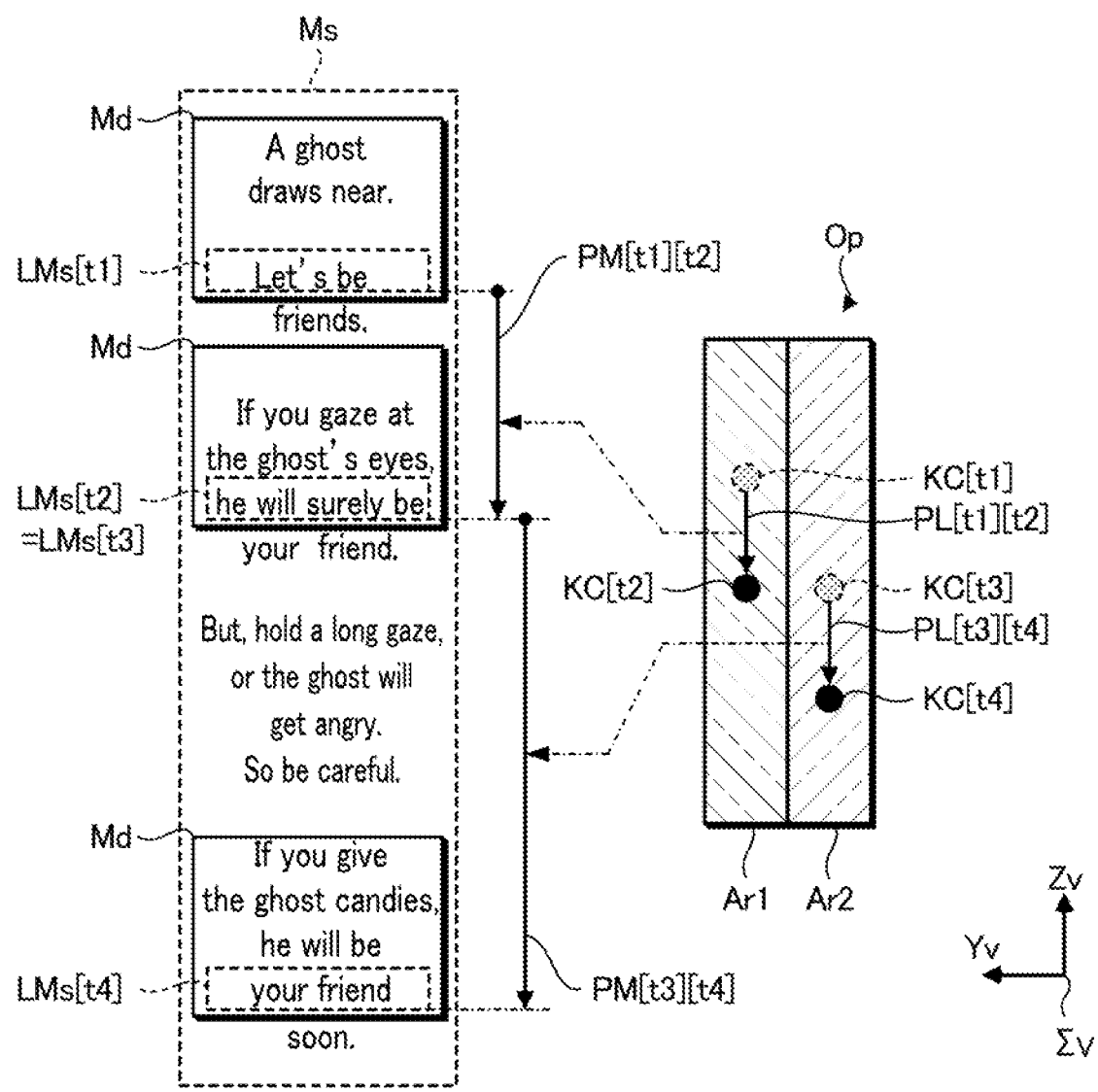
FIG. 23 is an explanatory diagram for an example of an intersection KC and the display message Md according to modification 4.

FIG. 23 is an explanatory diagram according to the modification of the relationships among the following: the position of the intersection KC of the virtual straight line LC with the controlled object Op; the vector PL representative of the movement of the intersection KC; and the vector PM defining the movement of the display range of the message Ms, the display range being a part of the message Ms and displayed in the display region. In FIG. 23, an exemplary case in which the controlled object Op is divided into an area Ar1 (an example of "a first area") and an area Ar2 (an example of "a second area"). Specifically, in an example of FIG. 23, the controlled object Op is divided into two halves in the $Y_V$-axis direction. The left area is set as the area Ar1, and the right area is set as the area Ar2. In FIG. 23, an exemplary case is assumed in which the virtual straight line LC and the controlled object Op intersect each other at the intersection KC[t1] at time t1, they intersect each other at the intersection KC[t2] at time t2, they intersect each other at the intersection KC[t3] at time t3, and they intersect each other at the intersection KC[t4] at time t4. In FIG. 23, an exemplary case is assumed in which the intersections KC[t1] and KC[t2] are positioned in the area Ar1, and the intersections KC[t3] and KC[t4] are positioned in the area Ar2. In FIG. 23, an exemplary case is assumed in which the intersections KC[t1] and KC[t2] have the same position in the $Y_V$-axis direction, the intersections KC[t3] and KC [t4] have the same position in the $Y_V$-axis direction, and the intersections KC[t2] and KC[t3] have the same position in the $Z_V$-axis direction. In FIG. 23, an exemplary case is assumed in which the length of the vector PL[t][t2] connecting the intersection KC[t1] to the intersection KC[t2] is equals to that of the vector PL[t3][t4] connecting the intersection KC[t3] to the intersection KC[t4]. In the following description, a vector obtained by extracting the $Z_V$-axis component of the vector PL[t−1][t] will be referred to as "a vector PL-Z[t−1][t]."

In the modification, when the start point and the end point of the vector PL[t−1][t] is present inside the area Ar1, the display range setter 113 calculates the vector PM[t−1][t] by the following Equation (2). In the modification, when the start point and the endpoint of the vector PL[t−1][t] is present inside the area Ar2, the display range setter 113 calculates the vector PM[t−1][t] by the following Equation (3). In the modification, when either the start point or the end point of the vector PL[t−1][t] is present inside the area Ar1, and the other point of the vector PL[t−1][t] is present inside the area Ar2, the display range setter 113 calculates the vector PM[t−1][t] by the following Equation (4).

$$PM[t-1][t]=\alpha 1*(PL-Z[t-1][t]) \quad (2)$$

$$PM[t-1][t]=\alpha 2*(PL-Z[t-1][t]) \quad (3)$$

$$PM[t-1][t]=\alpha 3*(PL-Z[t-1][t]) \quad (4)$$

Here, the coefficients α1, α2, and α3 in the Equations (2) to (4) refer to positive real numbers satisfying the following Equation (5).

$$0<\alpha 1<\alpha 3<\alpha 2 \quad (5)$$

In other words, in the modification, the ratio of the length of the vector PM[t−1][t] to the length of the vector PL-Z [t−1][t] corresponding to the vector PL[t−1][t] is greater, as compared to a case in which the start point and the ending point of the vector PL[t−1][t] are present in the area Ar2, and both are present in the area Ar1. For example, in an example shown in FIG. 23, while the vector PL[t1][t2] and the vector PM[t3][t4] have the same length, the length of the vector PL[t3][t4] is longer than that of the vector PM[t][t2].

As described above, in the modification, the display range setter 113 determines the ratio of the length of the vector PM to the vector PL, based on the position of the intersection KC of the virtual straight line LC with the controlled object Op. For this reason, according to the modification, the user U wearing the HMD 1 is able to manage both of the following: a prompt displaying of a desired display range of the message Ms on the message board Bd; and an accurate displaying of a desired display range of the message Ms at an accurate position of the message board Bd.

In the modification, the controlled object Op is divided into two areas: the area Ar1 and the area Ar2. However, the present invention is not limited to such an aspect. For example, the controlled object Op may be divided into three or more areas. In this case, the display range setter 113 may determine, based on the area at which the start point and the end point of the vector PL[t−1][t] are positioned, the ratio of the length of the vector PM[t−1][t] relative to the length of the vector PL-Z[t−1][t] corresponding to the vector PL-L [t−1] [t].

For example, the display range setter 113 may calculate the vector PM [t−1] [t] by the following Equation (6).

$$PM[t-1][t]=\gamma(Yk)*(PL-Z[t-1][t]) \quad (6)$$

Here, the position Yk is real number representative of the position of the intersection KC in the $Y_V$-axis direction. The function γ (Yk) has an argument of the position Yk, and satisfies the following Equation (7) for any real numbers Yk1 and Yk2 that satisfies Yk1>Yk2.

$$0<\gamma(Yk1)<\gamma(Yk2) \quad (7)$$

In other words, according to an example of Equation (6), the display range setter 113 determines, based on the positions of the start point and the end point of the vector PL[t−1][t] in the $Y_V$-axis direction, the ratio of the length of the vector PM[t−1][t] relative to the length of the vector PL-Z[t] corresponding to the vector PL[t−1][t].

Modification 5

In the foregoing embodiment and the modifications, the display range setter 113 may determine, based on a moving velocity of the intersection KC of the virtual straight line LC with the controlled object Op, a moving velocity of the display range of the message Ms, the display range being a part of the message Ms and displayed in the display region. According to the modification, the user U wearing the HMD 1 is able to manage both of the following: a prompt displaying of a desired display range of the message Ms on the message board Bd; and an accurate displaying of a desired display range of the message Ms at an accurate position of the message board Bd.

Modification 6

In the foregoing embodiment and the modifications, when the virtual straight line LC and the controlled object Op intersect each other in the virtual space SP-V, the display range of the message Ms, the display range being a part of the message Ms and displayed in the display region, is changeable. However, the present invention is not limited to such an aspect. For example, when the virtual straight line LC and the message board Bd intersect each other, the display range setter 113 may change the display range of the message Ms, the display range being a part of the message Ms and displayed in the display region. In other words, the message board Bd may play a role in the controlled object Op according to the foregoing embodiment and modifications.

Modification 7

In the foregoing embodiment and the modifications, on the bases of the position of the intersection KC of the virtual straight line LC with the controlled object Op, the moving velocity of the intersection KC, or the vector PL representative of an amount to move the intersection KC, the display range setter 113 determines one of the following: the display range of the message Ms, the display range being a part of the message Ms and displayed in the display region; the vector PM representative of an amount to move the display range of the message Ms, the display range being a part of the message Ms and displayed in the display region; and the moving velocity of the display range of the message Ms, the display range being a part of the message Ms and displayed in the display region. However, the present invention is not limited to such an aspect. The display range setter 113 may determine the vector PM, which is representative of an amount to move the display range of the message Ms, the display range being a part of the message Ms and displayed in the display region, based on the rotational angle $\theta_X$ relative to the roll direction $Q_X$ from the reference orientation of the HMD 1, of the change dB in orientation of the HMD 1.

For example, in a state in which the virtual straight line LC and the controlled object Op intersect each other, when the HMD 1 rotates by an angle $\theta_X$ relative to the roll direction $Q_X$ from the reference orientation, the display range setter 113 may set the vector PM as a vector that has the length corresponding to the angle $\theta_X$ and is oriented in the $-Z_V$-direction. Conversely, in a state in which the virtual straight line LC and the controlled object Op intersect each other, when the HMD 1 rotates by an angle $\theta_X$ from the reference orientation relative to the opposite direction (hereafter, "an opposite roll direction Q-x") to the roll direction $Q_X$, the display range setter 113 may set the vector PM as a vector that has a length corresponding to the angle $\theta_X$ and is oriented in the $+Z_V$-direction. In other words, in a state in which the virtual straight line LC and the controlled object Op intersect each other, when the HMD 1 rotates by an angle $\theta_X$ relative to the roll direction $Q_X$ from the reference orientation, the display range setter 113 may slide the display content of the message Ms to be displayed on the message board Bd in the $+Z_V$-direction by a distance that corresponds to the angle $\theta_X$. Conversely, in a state in which the virtual straight line LC and the controlled object Op intersect each other, when the HMD 1 rotates by an angle $\theta_X$ relative to the opposite roll direction $Q_{-X}$ from the reference orientation, the display range setter 113 may slide the display content of the message Ms to be displayed on the message board Bd in the $-Z_V$-direction by a distance that corresponds to the angle $\theta_X$. According to this example, the user U wearing the HMD1 is able to input various instructions by changing the orientation of the HMD 1.

For example, in a state in which the virtual straight line LC and the controlled object Op intersect each other, the display range setter 113 may determine the vector PM, based on the orientation of the HMD 1 and the direction of a change in orientation of the HMD 1. For the sake of clarity, a "forward rotational state" will be defined by a state of a change in orientation of the HMD 1 from the reference orientation in a range ranging from 0 degrees to 180 degrees relative to the roll direction $Q_X$. Furthermore, in the following description, a "backward rotational state" will be defined by a state of a change in orientation of the HMD 1 from the reference orientation in a range ranging from 0 degrees to 180 degrees relative to the opposite roll direction Q-x. For example, in a state in which the HMD 1 is in the forward rotational state, and the virtual straight line LC and the controlled object Op intersect each other, when the HMD 1 rotates by an angle $\theta_X$ relative to the roll direction $Q_X$, the display range setter 113 may set the vector PM as a vector that has a length corresponding to the angle $\theta_X$ and is oriented in the $-Z_V$-direction. Furthermore, in the state in which the HMD 1 is in the forward rotational state, and the virtual straight line LC and the controlled object Op intersect each other, when the HMD 1 rotates by an angle $\theta_X$ relative to the opposite roll direction $Q_{-X}$, the display range setter 113 may set the vector PM as a vector that has the length "0." In this case, for example, in a state in which the HMD 1 is in the backward rotational state, and the virtual straight line LC and the controlled object Op intersect each other, when the HMD 1 rotates by an angle $\theta_X$ relative to the opposite roll direction $Q_{-X}$, the display range setter 113 may set the vector PM as a vector that has the length corresponding to the angle $\theta_X$ and is oriented in the $+Z_V$-direction. Furthermore, in the state in which the HMD 1 is in the backward rotational state, and the virtual straight line LC and the controlled object Op intersect each other, when the HMD 1 rotates by an angle $\theta_X$ relative to the roll direction $Q_X$, the display range setter 113 may set the vector PM as a vector that has the length "0." In other words, in a state in which the HMD 1 is in the forward rotational state, and the virtual straight line LC and the controlled object Op intersect each other, when the HMD 1 rotates by an angle $\theta_X$ relative to the roll direction $Q_X$, the display range setter 113 may slide the display content of the message Ms to be displayed on the message board Bd in the $+Z_V$-direction by a distance that corresponds to the angle $\theta_X$. Conversely, in a state in which the HMD 1 is in the forward rotational state, and the virtual straight line LC and the controlled object Op intersect each other, when the HMD 1 rotates by an angle $\theta_X$ relative to the opposite roll direction Q-x, the display range setter 113 may not change the display content of the message Ms to be displayed on the message board Bd. In this case, in a state in which the HMD 1 is in the backward rotational state, and the virtual straight line LC and the controlled object Op intersect each other, when the HMD 1 rotates by an angle $\theta_X$ relative to the opposite roll direction Q-x, the display range setter 113 may slide the display content of the message Ms to be displayed on the message board Bd in the $-Z_V$-direction by a distance that corresponds to the angle $\theta_X$. Conversely, in a state in which the HMD 1 is in a backward rotational state, and the virtual straight line LC and the controlled object Op intersect each other, when the HMD 1 rotates by an angle $\theta_X$ relative to the roll direction $Q_X$, the display range setter 113 may not change the display content of the message Ms to be displayed on the message board Bd. According to this example, the user U wearing the HMD 1 sets the HMD1 to the forward rotational state, the user U is able to change gradually the display content of the message Ms to be displayed on the message board Bd in the $+Z_V$-direction. Conversely, when the user U sets the HMD 1 to a backward rotational state, the user U is able to gradually change the display content of the message Ms to be displayed on the message board Bd in the $-Z_V$-direction.

Modification 8

In the foregoing embodiment and the modifications, the orientation information B represents the detection result of a change in orientation of the terminal apparatus 10. However, the present invention is not limited to such an aspect. The orientation information B may represent, for example, the orientation of the terminal apparatus 10 viewed by a coordinate system fixed on the ground. In this case, the orientation information generator 14 may be configured to include, for example, one or both of an acceleration sensor and a geomagnetic sensor. Furthermore, in this case, the orientation information B may represent, for example, an image to be output from a camera that captures an image of the HMD 1 provided outside the HMD 1.

Modification 9

In the foregoing embodiment and the modifications, the information processing apparatus is provided in the HMD 1. However, the information processing apparatus may be provided separately from the HMD 1.

Figure 24:
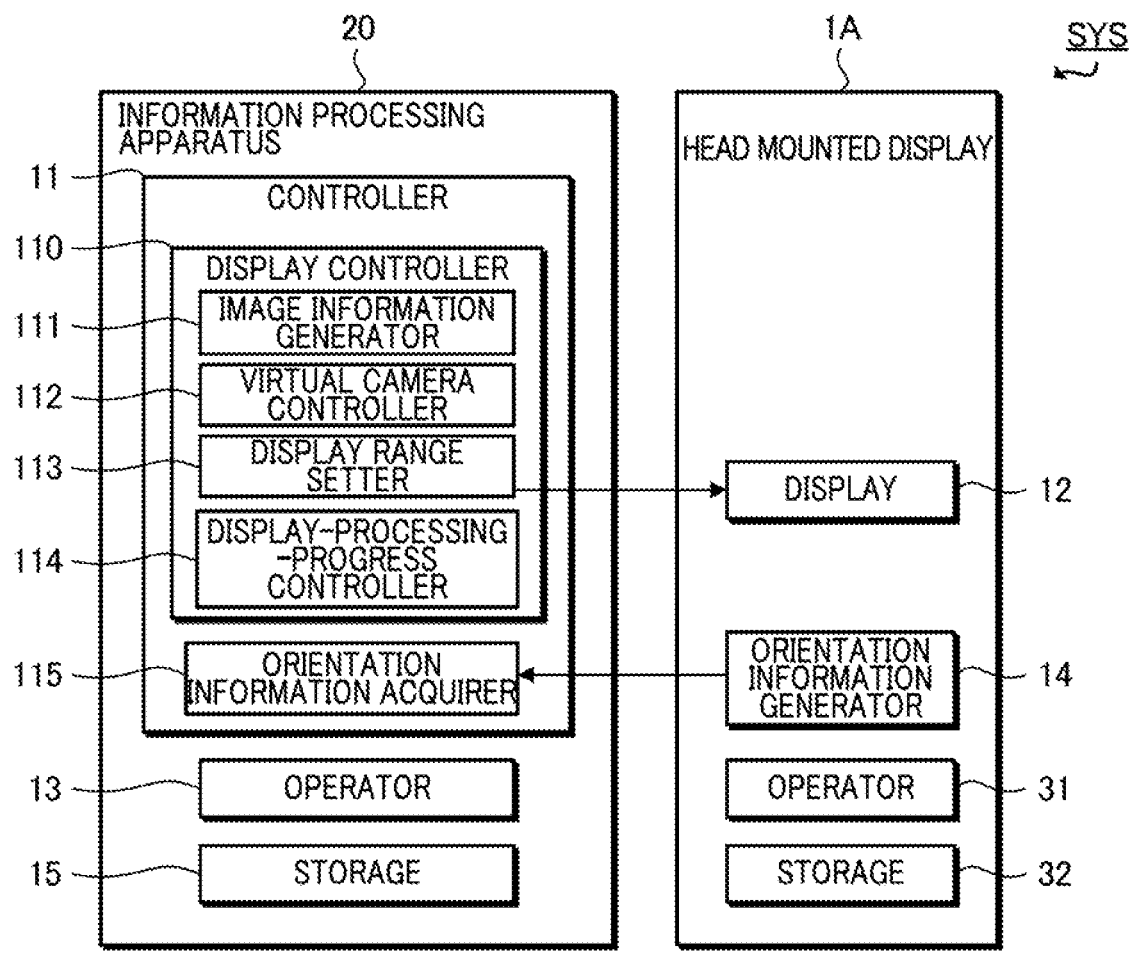
FIG. 24 is an exemplary block diagram for a configuration of an information processing system SYS according to modification 9.

FIG. 24 is an exemplary block diagram for a configuration of an information processing system SYS according to the modification. As shown in FIG. 24, the information processing system SYS includes an information processing apparatus 20 and a Head Mounted Display 1A that is communicable with the information processing apparatus 20. Among these components, the information processing apparatus 20 may include, for example, the controller 11, the operator 13, and the storage 15. The Head Mounted Display 1A may include, in addition to the display 12 and the orientation information generator 14, an operator 31 that receives an input operation carried out by the user U wearing the Head Mounted Display 1A, and a storage 32 that stores therein various information.

Modification 10

In the foregoing embodiment and the modifications, the virtual straight line $L_C$ represents the optical axis of the virtual camera CM. However, the present invention is not limited to such an aspect. For example, in a case in which the HMD 1 has an eye tracking function of measuring a direction of the line of sight of the user U wearing it, the line of sight of the user U measured by the eye tracking function may be used as the virtual straight line LC.

C. Appendix

From the above description, the present invention can be understood, for example, as follows. In order to clarify each aspect, reference numerals in the drawings are appended below in parentheses for convenience. However the present invention is not limited to the drawings.

Appendix 1

A non-transitory computer readable recording medium (e.g., a memory 1001) having recorded therein a program (e.g., a control program PRG), the program causes a processor (e.g., a processor 1000) of an information processing apparatus (e.g., a terminal apparatus 10) to function as: a display controller (e.g., a display controller 110) configured to cause a display (e.g., display 12) provided on a Head Mounted Display (e.g., a HMD 1) to display a stereoscopic image to which binocular parallax is applied, the stereoscopic image being an image of a virtual space (e.g., a virtual space SP-V) captured by a virtual camera (e.g., a virtual camera CM); and an acquirer (e.g., an orientation information acquirer 115) configured to acquire orientation information (e.g., orientation information B) on an orientation of the Head Mounted Display, in which: when, in the virtual space, a predetermined positional relationship (e.g., an intersection relationship) is established between a virtual object (e.g., a controlled object Op) that exists in the virtual space and a virtual line (e.g., a virtual straight line LC) that passes through the virtual camera, the virtual line having a direction according to the orientation information, the display controller is configured to move, based on a change in relative position between the virtual line and the virtual object, a display range (e.g., a region for displaying information provided on a message board Bd) of display information (e.g., a message Ms) to be displayed in the virtual space, the display range being a part of the display information and displayed in the display region provided in the virtual space.

According to this aspect, when the predetermined positional relationship is established between the virtual line having a direction according to an orientation of the Head Mounted Display and the virtual object, the display range of the display information displayed in the display region is changed based on a change in relative position between the virtual line and the virtual object. In other words, according to this aspect, when the predetermined positional relationship is established between the virtual line and the virtual object, the user wearing the Head Mounted Display changes an orientation of the Head Mounted Display to change a direction of the virtual line, thereby enabling changing the display range of the display information displayed in the display region. According to this aspect, when the predetermined positional relationship is not established, the user wearing the Head Mounted Display changes the orientation of the Head Mounted Display, thereby enabling carrying out another input operation, for example, an input operation to change the orientation of the virtual camera in the virtual space, in addition to an input operation to change the display range of the display information displayed in the display region. Accordingly, according to this aspect, the user wearing the Head Mounted Display is able to carry out the following: an input operation to change an orientation of the virtual camera by changing the orientation of the Head Mounted Display; and an input operation other than an input operation to change the orientation of the virtual camera. As a result, the user is able to input various instructions by changing the orientation of Head Mounted Display.

In the above aspect, the "virtual camera" may include a first virtual camera that captures an image of the virtual space and a second virtual camera that captures an image of the virtual space at a position that differs from that of the first virtual camera, for example. The "stereoscopic image" may include the following: an image for the left eye, which is an image of the virtual space captured by the first virtual camera and is viewed by the user's left eye; and an image for the right eye, which is an image of the virtual space captured by the second virtual camera and is viewed by the user's right eye, for example.

In the above aspect, the "Head Mounted Display" may be a display apparatus that is wearable on the user's head, for example. Specifically, the "Head Mounted Display" may be a goggle-type or eyeglass-type display apparatus that is wearable on the user's head. The "Head Mounted Display" may include wearable equipment that is wearable on the user's head, and a portable display apparatus, such as a smartphone, that is mounted on the wearable equipment.

In the above aspect, the "orientation of the Head Mounted Display" may be a direction of the Head Mounted Display, or may be an inclination of the Head Mounted Display, or may be a concept including both the direction and the inclination of the Head Mounted Display, for example. Here, the "direction of the Head Mounted Display" may be a direction in which the Head Mounted Display is oriented in the real space, or may be an angle between the reference direction of the Head Mounted Display and the direction of magnetic north, for example. The "inclination of the Head Mounted Display" may be an angle between the reference direction of the Head Mounted Display and the vertical direction, for example.

In the above aspect, the "orientation information" may indicate the orientation of the Head Mounted Display or may indicate a change in orientation of the Head Mounted Display, for example.

In the above aspect, the "acquirer" may acquire the orientation information from the Head Mounted Display, or may acquire the orientation information from an imaging apparatus that captures the Head Mounted Display. In a case in which the acquirer acquires the orientation information from the Head Mounted Display, the Head Mounted Display may include a sensor for detecting information indicative of a change in orientation of the Head Mounted Display, or may include a sensor for detecting information indicative of the orientation of the Head Mounted Display. Here, the "sensor for detecting information indicative of a change in orientation of the Head Mounted Display" may be an angular velocity sensor, for example. Alternatively, the "sensor for detecting information indicative of the orientation of the Head Mounted Display" may be one or both of a geomagnetic sensor and an angular velocity sensor. In a case in which the acquirer acquires the orientation information from the imaging apparatus that captures an image of the Head Mounted Display, the orientation information may be an image of the Head Mounted Display captured by the imaging apparatus.

In the above aspect, the "virtual line" may be a straight line that extends in the direction in which the virtual camera is oriented in the virtual space, for example. Specifically, the "virtual line" may be the optical axis of the virtual camera. Alternatively, the "vertical line" may be a straight line that extends in a sight direction of the user wearing the Head Mounted Display, for example. In this case, the Head Mounted Display may have an eye tracking feature that detects a sight direction of the user wearing it.

In the above aspect, the "direction of the virtual line" may be described by values of components constituting of the unit vector indicative of the direction of the virtual line, in the coordinate system fixed in the virtual space, for example. Alternatively, the "direction of the virtual line" may be described by an angle between the virtual line and each of the coordinate axis of the coordinate system fixed in the virtual space, for example.

In the above aspect, the "virtual object" may be a virtual object that exists in virtual space or may be a specific region that exists in virtual space, for example. In the case in which the "virtual object" may be a specific region that exists in the virtual space, the region may be a region that is separated from the surroundings thereof by color or pattern. In the virtual space, the region in which the virtual object exists may be one having one dimension, such as a straight line, a curve and a line segment, may be one having two dimensions, such as a square, a triangle and a circle, or may be a three dimensional solid.

In the above aspect, the "the predetermined positional relationship is established between the virtual line and the virtual object" may refer to a case in which the virtual line and the virtual object intersect each other, for example. The "the predetermined positional relationship is established between the virtual line and the virtual object" may refer to a case in which a distance between the virtual line and the virtual object is equal to or less than a predetermined distance.

In the above aspect, the "change in the relative position between the virtual line and the virtual object" may refer to a case in which when the virtual line and the virtual object intersect each other, the intersection position of the virtual line with the virtual object changes, for example. Here, the "intersection position of the virtual line with the virtual object" may refer to a case in which when the virtual object has a three-dimensional shape, a position where the virtual line and the surface of the virtual object intersect each other, for example. Alternatively, the "intersection position of the virtual line with the virtual object" may refer to a case in which when the virtual object has a three-dimensional shape and the virtual line and the surface of the virtual object intersect each other at a plurality of positions, the position closest to the virtual camera among from the plurality of positions, for example.

In the above aspect, the "display region" may be described by an object in the virtual space, such as a virtual display apparatus or other similar apparatus for displaying information in the virtual space, for example.

In the above aspect, the "display information" may refer to an image representative of a character string, a drawing, a pattern, or an image showing a combination thereof.

Appendix 2

The recording medium according to another aspect of the present invention is a recording medium according to Appendix 1, in which the display controller is configured to determine an amount to move the display range, based on an amount of change in position of the virtual line relative to the virtual object.

According to this aspect, when the predetermined positional relationship is established between the virtual line and the virtual object, the user wearing the Head Mounted Display changes an orientation of the Head Mounted Display to change an amount of change in direction of the virtual line, thereby enabling adjusting an amount to move the display range of the display information displayed in the display region, for example. For this reason, this aspect allows for the user wearing the Head Mounted Display to display, in the display region, a desired display range of the display information.

In the above aspect, the "position of the virtual line relative to the virtual object" may refer to a case in which when the virtual line and the virtual object intersect each other, a position of the intersection of the virtual line with the virtual object.

Appendix 3

The recording medium according to another aspect of the present invention is a recording medium according to Appendix 1 or 2, in which the display controller is configured to determine, based on a direction in which a position of the virtual line changes relative to the virtual object, a direction in which the display range moves.

According to this aspect, when a predetermined positional relationship is established between the virtual line and the virtual object, the user wearing the Head Mounted Display changes an orientation of the Head Mounted Display to adjust a direction in which the virtual line changes, thereby enabling adjusting a direction in which the display range of the display information that is displayed in the display region changes, for example. For this reason, this aspect allows for the user wearing the Head Mounted Display to move, in a desired direction, a desired display range that is a part displayed in the display region, of the display information.

Appendix 4

The recording medium according to another aspect of the present invention is a recording medium according to any one of Appendixes 1 to 3, in which the display controller is configured to determine an amount to move the display range, based on: the relative position between the virtual line and the virtual object; and the amount of change in position of the virtual line relative to the virtual object.

According to this aspect, when the predetermined positional relationship is established between the virtual line and the virtual object, the user wearing the Head Mounted Display changes an orientation of the Head Mounted Display to adjust a position of the virtual line relative to the virtual object and an amount of change in direction of the virtual line, thereby enabling adjusting an amount to move the display range of the display information displayed in the display region, for example. For this reason, this aspect allows for the user wearing the Head Mounted Display to display, in the display region, a desired display range of the display information.

In the above aspect, the display controller may determine an amount to move the display range of the display information, the display range being a part of the display information and displayed in the display region such that this amount is smaller, as compared to an exemplary case as follows: the virtual line and the virtual object intersect each other; a position of the intersection of the virtual line with the virtual object is located in a first region of the virtual object; and the position is located in a second region of the virtual object.

Appendix 5

The recording medium according to another aspect of the present invention is a recording medium according to any one of Appendixes 1 to 4, in which when the virtual line and the virtual object intersect each other, the display controller is configured to determine, based on a moving velocity of an intersection of the virtual line with the virtual object, a moving velocity of the display range.

According to this aspect, when the predetermined positional relationship is established between the virtual line and the virtual object, the user wearing the Head Mounted Display changes an orientation of the Head Mounted Display to adjust a moving velocity of a position of the intersection of the virtual line with the virtual object, thereby enabling adjusting a speed at which the display range of the display information displayed in the display region moves, for example. For this reason, this aspect allows for the user wearing the Head Mounted Display to display promptly, in the display region, a desired display range of the display information, as compared to a case in which a speed at which the display range moves is not adjustable, for example.

In the above aspect, the display controller may determine a moving velocity of the display range, based on the maximum speed of the position of the intersection during a period at which the virtual line and virtual object intersect each other, for example.

Appendix 6

The recording medium according to another aspect of the present invention is a recording medium according to any one of Appendixes 1 to 5, in which when: a state in which the predetermined positional relationship is not established between the virtual line and the virtual object is changed to a state in which the predetermined positional relationship is established; and a position of the virtual line relative to the virtual object satisfies a predetermined condition (e.g., movement start condition), the display controller is configured to move the display range, based on a change in the relative position between the virtual line and the virtual object.

According to this aspect, when a state is changed to a state in which the predetermined positional relationship is established between the virtual line and the virtual object, on the premise that a position of the intersection of the virtual line relative to the virtual object satisfies the predetermined condition, the user wearing the Head Mounted Display changes the display range of the display information displayed in the display region, for example. For this reason, this aspect enables prevention of the display range of the display information displayed in the display region from changing due to an incorrect input operation made by the user wearing the Head Mounted Display.

In the above aspect, the "the predetermined condition" may be that an amount to move a position of the virtual line relative to the virtual object is equal to or less than a predetermined threshold over a period of time, for example. Specifically, the "the predetermined condition" may be that the position of the virtual line relative to the virtual object remains substantially unchanged, for example. Alternatively, in the above aspect, the "predetermined condition" may be that the position of the virtual line viewed by the virtual object draws a predetermined trajectory, for example.

Appendix 7

The recording medium according to another aspect of the present invention is a recording medium according to any one of Appendixes 1 to 6, in which: in a state in which the orientation of the Head Mounted Display rotates by a predetermined angle or more from a reference angle about a predetermined reference axis (e.g., $X_S$-axis), the display controller is configured to move the display range, based on a change in the relative position between the virtual line and the virtual object.

According to this aspect, on the premise that the orientation of the Head Mounted Display rotates by the predetermined angle or more from the reference angle about the predetermined reference axis, the user wearing the Head Mounted Display changes the display range of the display information displayed in the display region, for example. For this reason, this aspect enables prevention of the display range of the display information displayed in the display region from changing due to an incorrect input operation made by the user wearing the Head Mounted Display.

In the above aspect, the "predetermined reference axis" may be a rotational axis of the Head Mounted Display in the roll direction, for example.

Appendix 8

The recording medium according to another aspect of the present invention is a recording medium according to any one of Appendixes 1 to 6, in which, in the virtual space, a distance from the virtual camera to the virtual object is substantially the same as a distance from the virtual camera to the display region.

According to this aspect, in the virtual space, the virtual camera is arranged at substantially the same distance from both the virtual object and the display region. For this reason, according to this aspect, when the user wearing the Head Mounted Display changes an orientation of the Head Mounted Display to adjust the relative position between the virtual line and the virtual object, thereby adjusting an amount to move the display range of the display information displayed in the display region, this aspect enables adjusting the amount to move the display range with ease, as compared to a case in which the virtual camera is not arranged at substantially the same distance from both the virtual object and the display region, for example. Furthermore, according to this aspect, the virtual camera is arranged at substantially the same distance from both the virtual object and the display region. For this reason, this aspect enables the making of a parallax angle of the user wearing the Head Mounted Display when the user views the virtual object substantially equal to a parallax angle of the user when the user views the display region. In other words, this aspect enables reduction in variation of a focal length from the user wearing the Head Mounted Display to a subject to be viewed by the user when the user switches the subject from the virtual object to the display region and vice versa, as compared to a case in which the distance from the virtual camera to the virtual object differs from the distance from the virtual camera to the display region, for example. Thus, this aspect enables improved visibility for the user wearing the Head Mounted Display, of the virtual object and the display region, as compared to a case in which the distance from the virtual camera to the virtual object differs from the distance from the virtual camera to the display region.

Appendix 9

An information processing apparatus according to an aspect of the present invention includes: a display controller configured to cause a display provided on a Head Mounted Display to display a stereoscopic image to which binocular parallax is applied, the stereoscopic image being an image of a virtual space captured by a virtual camera; and an acquirer configured to acquire orientation information on an orientation of the Head Mounted Display, in which: when, in the virtual space, a predetermined positional relationship is established between a virtual object that exists in the virtual space and a virtual line that passes through the virtual camera, the virtual line having a direction according to the orientation information, the display controller is configured to move, based on a change in relative position between the virtual line and the virtual object, a display range of display information to be displayed in the virtual space, the display range being a part of the display information and displayed in the display region provided in the virtual space.

According to this aspect, when the predetermined positional relationship is established between the virtual line having a direction according to an orientation of the Head Mounted Display and the virtual object, the display range of the display information displayed in the display region is changed based on a change in the relative position between the virtual line and the virtual object. For this reason, according to this aspect, when the predetermined positional relationship is established between the virtual line and the virtual object, the user wearing the Head Mounted Display changes an orientation of the Head Mounted Display to change a direction of the virtual line, thereby enabling changing the display range of the display information displayed in the display region.

Appendix 10

A Head Mounted Display according to an aspect of the present invention includes: a display; and an information processing apparatus, wherein the information processing apparatus includes: a display controller configured to cause the display to display a stereoscopic image to which binocular parallax is applied, the stereoscopic image being an image of a virtual space captured by a virtual camera; and an acquirer configured to acquire orientation information on an orientation of the Head Mounted Display, in which: when, in the virtual space, a predetermined positional relationship is established between a virtual object that exists in the virtual space and a virtual line that passes through the virtual camera, the virtual line having a direction according to the orientation information, the display controller is configured to move, based on a change in relative position between the virtual line and the virtual object, a display range of display information to be displayed in the virtual space, the display range being a part of the display information and displayed in the display region provided in the virtual space.

According to this aspect, when the predetermined positional relationship is established between the virtual line having a direction according to an orientation of the Head Mounted Display and the virtual object, the display range of the display information displayed in the display region is changed based on a change in the relative position between the virtual line and the virtual object. For this reason, according to this aspect, when the predetermined positional relationship is established between the virtual line and the virtual object, the user wearing the Head Mounted Display changes an orientation of the Head Mounted Display to change a direction of the virtual line, thereby enabling change of the display range of the display information displayed in the display region.

Appendix 11

An information processing system according to an aspect of the present invention includes: a Head Mounted Display including a display; and an information processing apparatus, wherein the information apparatus includes: a display controller configured to cause the display to display a stereoscopic image to which binocular parallax is applied, the stereoscopic image being an image of a virtual space captured by a virtual camera; and an acquirer configured to acquire orientation information on an orientation of the Head Mounted Display, in which: when, in the virtual space, a predetermined positional relationship is established between a virtual object that exists in the virtual space and a virtual line that passes through the virtual camera, the virtual line having a direction according to the orientation information, the display controller is configured to move, based on a change in relative position between the virtual line and the virtual object, a display range of display information to be displayed in the virtual space, the display range being a part of the display information and displayed in the display region provided in the virtual space.

According to this aspect, when the predetermined positional relationship is established between the virtual line having a direction according to an orientation of the Head Mounted Display and the virtual object, the display range of the display information displayed in the display region is changed based on a change in the relative position between the virtual line and the virtual object. For this reason, according to this aspect, when the predetermined positional relationship is established between the virtual line and the virtual object, the user wearing the Head Mounted Display changes an orientation of the Head Mounted Display to change a direction of the virtual line, thereby enabling changing the display range of the display information displayed in the display region.

DESCRIPTION OF REFERENCE SIGNS

1 . . . Head Mounted Display
10 . . . terminal apparatus
11 . . . controller
12 . . . display
13 . . . operator
14 . . . orientation information generator
15 . . . storage
20 . . . information processing apparatus
90 . . . wearable equipment
110 . . . display controller
111 . . . image information generator
112 . . . virtual camera controller
113 . . . display range setter
114 . . . display-processing-progress controller
115 . . . orientation information acquirer
1000 . . . processor
1002 . . . angular velocity sensor

What is claimed is:

1. A non-transitory computer readable recording medium having recorded therein a program that is executed by a processor of an information processing apparatus, the program causes the processor to:
  cause a display provided on a Head Mounted Display to display a stereoscopic image to which binocular parallax is applied, the stereoscopic image being an image of a virtual space captured by a virtual camera; and
  acquire orientation information on an orientation of the Head Mounted Display,
  wherein:
  when, in the virtual space, a predetermined positional relationship is established between a virtual object that exists in the virtual space and a virtual line that passes through the virtual camera, the virtual line having a direction according to the orientation information,
    the program causes the processor to move, based on a change in relative position between the virtual line and the virtual object, a position of unit display information within a display region that is provided in the virtual space, the unit display information being included in display information to be displayed in the display region and the display information being included in information to be displayed in the virtual space,
    wherein a relative position between the display region and the virtual line is changed in response to a change in orientation of the Head Mounted Display.

2. The recording medium according to claim 1, wherein the program causes the processor to determine an amount to move the position of the unit display information, based on an amount of change in position of the virtual line relative to the virtual object.

3. The recording medium according to claim 1, wherein the program causes the processor to determine, based on a direction in which a position of the virtual line changes relative to the virtual object, a direction in which the position of the unit display information moves.

4. The recording medium according to claim 1, wherein the program causes the processor to determine an amount to move the position of the unit display information, based on:
  the relative position between the virtual line and the virtual object; and
  the amount of change in position of the virtual line relative to the virtual object.

5. The recording medium according to claim 1, wherein, when the virtual line and the virtual object intersect each other, the program causes the processor to determine, based on a moving velocity of an intersection of the virtual line with the virtual object, a moving velocity of the position of the unit display information.

6. The recording medium according to claim 1, wherein, when:
  a state in which the predetermined positional relationship is not established between the virtual line and the virtual object is changed to a state in which the predetermined positional relationship is established; and
  a position of the virtual line relative to the virtual object satisfies a predetermined condition,
    the program causes the processor to move the position of the unit display information, based on the change in the relative position between the virtual line and the virtual object.

7. The recording medium according to claim 1, wherein:
  in a state in which the orientation of the Head Mounted Display rotates by a predetermined angle or more from a reference angle about a predetermined reference axis,
    the program causes the processor to move the position of the unit display information, based on the change in the relative position between the virtual line and the virtual object.

8. The recording medium according to claim 1, wherein, in the virtual space, a distance from the virtual camera to the virtual object is substantially same as a distance from the virtual camera to the display region.

9. The recording medium according to claim 1, where the predetermined positional relationship is an intersection between the virtual line and the virtual object.

10. The recording medium according to claim 9, when, in the virtual space, the intersection between the virtual line and the virtual object is not established, the program causes the processor to generate an image of the virtual space based on the virtual line having the direction according to the orientation information.

11. The recording medium according to claim 1, wherein the display information comprises message information, the display region comprises a message board that exists in the virtual space, and the unit display information comprises a portion of the message information, and
  the program causes the processor to move, based on the change in relative position between the virtual line and the virtual object, the position of the portion of the message information within the message board.

12. An information processing system comprising:
a Head Mounted Display including a display; and
an information processing apparatus,
wherein:
the information apparatus includes:
  a processor; and
  a memory that is operatively coupled to the processor and is configured to store instructions executed by the processor,
upon execution of the instructions the processor is configured to:
  cause the display to display a stereoscopic image to which binocular parallax is applied, the stereoscopic image being an image of a virtual space captured by a virtual camera; and
  acquire orientation information on an orientation of the Head Mounted Display,
when, in the virtual space, a predetermined positional relationship is established between a virtual object that exists in the virtual space and a virtual line that passes through the virtual camera, the virtual line having a direction according to the orientation information,
  the processor is configured to move, based on a change in relative position between the virtual line and the virtual object, a position of unit display information within a display region that is provided in the virtual space, the unit display information being included in display information to be displayed in the display region, the display information being included in information to be displayed in the virtual space,
wherein a relative position between the display region and the virtual line is changed in response to a change in orientation of the Head Mounted Display.

13. An information processing method comprising:
causing a display provided on a Head Mounted Display to display a stereoscopic image to which binocular parallax is applied, the stereoscopic image being an image of a virtual space captured by a virtual camera; and
acquiring orientation information on an orientation of the Head Mounted Display, wherein:
in causing the display to display the stereoscopic image,
  when, in the virtual space, a predetermined positional relationship is established between a virtual object that exists in the virtual space and a virtual line that passes through the virtual camera, the virtual line having a direction according to the orientation information,
  moving, based on a change in relative position between the virtual line and the virtual object, a position of unit display information within a display region that is provided in the virtual space, the unit display information being included in display information to be displayed in the display region, the display information being included in information to be displayed in the virtual space,
wherein a relative position between the display region and the virtual line is changed in response to a change in orientation of the Head Mounted Display.

\* \* \* \* \*